(12) United States Patent
Kobayashi

(10) Patent No.: US 8,493,320 B2
(45) Date of Patent: Jul. 23, 2013

(54) DISPLAY CONTROL DEVICE, CONTENT OUTPUT SYSTEM, METHOD FOR CONTROLLING DISPLAY OF IMAGE USED IN RETRIEVAL OPERATION, AND PROGRAM

(75) Inventor: Arito Kobayashi, Kanagawa (JP)

(73) Assignee: Sony Corporation (JP)

( * ) Notice: Subject to any disclaimer, the term of this patent is extended or adjusted under 35 U.S.C. 154(b) by 1379 days.

(21) Appl. No.: 11/881,882

(22) Filed: Jul. 30, 2007

(65) Prior Publication Data

US 2008/0030488 A1 Feb. 7, 2008

(30) Foreign Application Priority Data

Aug. 4, 2006 (JP) ................ P2006-212784

(51) Int. Cl.
*G06G 5/00* (2006.01)
*G06F 3/048* (2006.01)

(52) U.S. Cl.
USPC .......................................... 345/156; 715/835

(58) Field of Classification Search
USPC .......................................... 345/156; 715/835
See application file for complete search history.

(56) References Cited

U.S. PATENT DOCUMENTS

| | | | |
|---|---|---|---|
| 6,448,987 B1 * | 9/2002 | Easty et al. ................... | 715/834 |
| 7,036,090 B1 * | 4/2006 | Nguyen ....................... | 715/834 |
| 7,155,674 B2 * | 12/2006 | Breen et al. ................... | 715/719 |
| 2005/0210410 A1 * | 9/2005 | Ohwa et al. ................... | 715/821 |
| 2006/0020900 A1 * | 1/2006 | Kumagai et al. .............. | 715/767 |

FOREIGN PATENT DOCUMENTS

| | | |
|---|---|---|
| JP | 09-214905 A | 8/1997 |
| JP | 2000-235578 A | 8/2000 |
| JP | 2004-529427 A | 9/2004 |
| WO | WO-02/082326 A2 | 10/2002 |
| WO | WO 2005124519 A1 * | 12/2005 |

* cited by examiner

*Primary Examiner* — Bipin Shalwala
*Assistant Examiner* — Steven Holton
(74) *Attorney, Agent, or Firm* — Lerner, David, Littenberg, Krumholz & Mentlik, LLP

(57) ABSTRACT

A display control device includes a retrieval image generation unit that generates images used in a retrieval operation which include retrieval condition images and item images arranged on a plane by arranging the retrieval condition images indicating a plurality of retrieval conditions for the plurality of pieces of content data in a first direction on a plane, and by arranging, in a second direction, the item images indicating pieces of content data or folders including pieces of content data categorized based on the retrieval conditions arranged in the first direction, and a retrieval image display control unit that displays the generated images used in a retrieval operation on the display unit, that detects an operation input, and that moves an indicator indicating a selected one of the retrieval condition images and the item images, in a vertical direction or a horizontal direction in accordance with the detected operation input.

6 Claims, 18 Drawing Sheets

MAIN MENU SCREEN

FIG. 4A
ITEM IMAGE REPRESENTING CONTENT DATA
Auto B
FIG. 4B
ITEM IMAGE REPRESENTING FOLDER
Rock
FIG. 4C
TAG INFORMATION
| Date: 1/2/2005 |
|---|
| Artist: ABCs |
| Genre: Rock |
| USER tag: Fun |

FIG. 5

FIG. 11
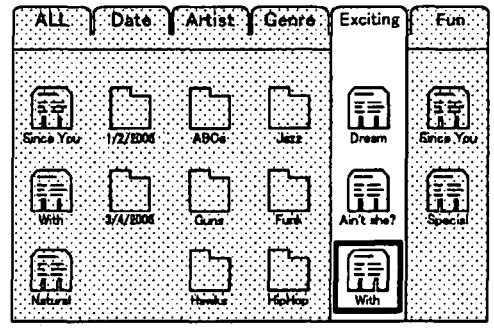
(a)
↓ UP KEY
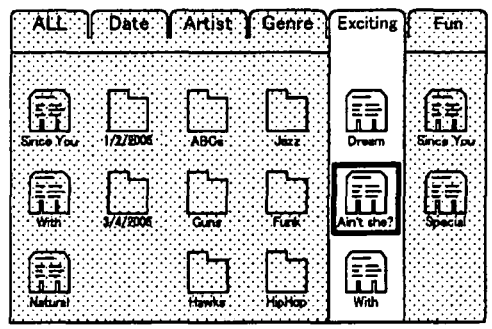
(b)
↓ UP KEY
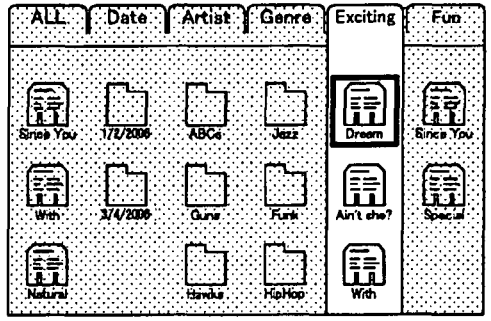
(c)
↓ UP KEY (ALL ITEM IMAGES ARE SCROLLED DOWNWARD)
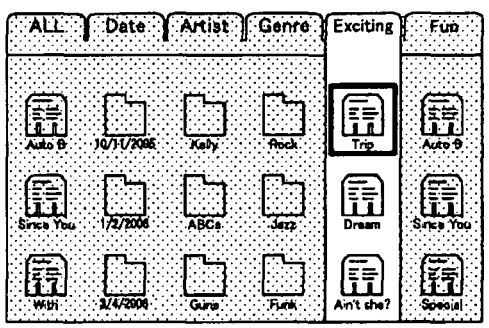
(d)

FIG. 16
(a) 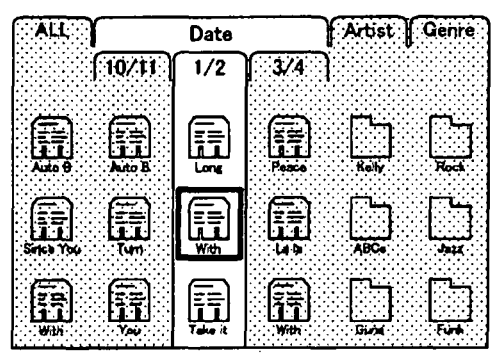
TOOL KEY
(b) 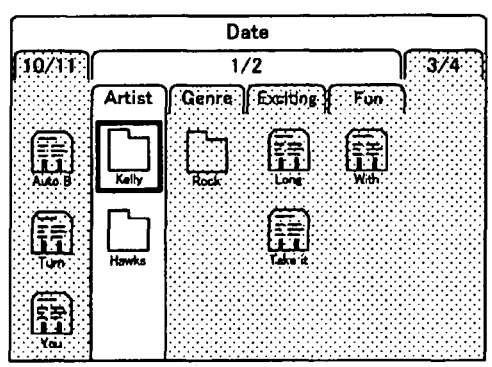

FIG. 17

FIG. 18
(a) 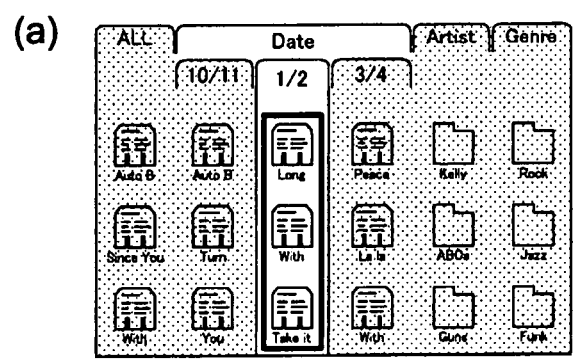
↓ TOOL KEY
(b) 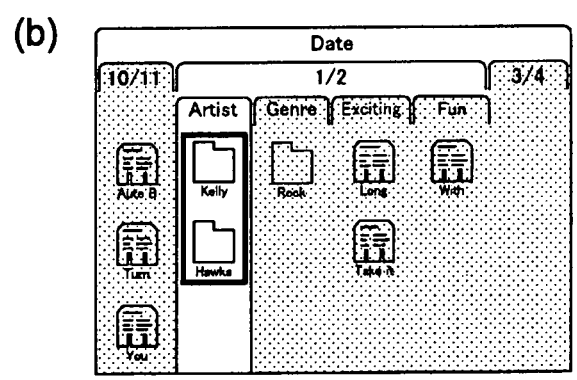

DISPLAY CONTROL DEVICE, CONTENT OUTPUT SYSTEM, METHOD FOR CONTROLLING DISPLAY OF IMAGE USED IN RETRIEVAL OPERATION, AND PROGRAM

CROSS-REFERENCE TO RELATED APPLICATIONS

The present application claims priority from Japanese Patent Application No. JP 2006-212784, filed in the Japanese Patent Office on Aug. 4, 2006, the entire content of which a cis incorporated herein by reference.

BACKGROUND OF THE INVENTION

1. Field of the Invention

The present invention relates to a display control device for displaying an image used in retrieval of a variety of content data, a content output system including the display control device, a method for controlling display of the image used in a retrieval operation, and a program for allowing the display control device to execute the display control of the image used in a retrieval operation.

2. Description of the Related Art

In recent years, audio visual (AV) devices or information processing apparatuses which are for personal use and which are used at home, for example, have been networked and have achieved high performance, and furthermore, recording media having increased capacities have been used. That is, an environment for using advanced apparatuses has been provided. In addition, for example, users often possess a considerable amount of content data such as audio data and video data and enjoy the content data representing content using the AV devices.

A large amount of content data may be stored in a high-capacity recording medium such as an HDD (hard disc drive). The user may download content data such as music data or image data through a network such as the Internet and may store the content data in the HDD. Alternatively, the user may obtain content data from a CD (compact disc) or a DVD (digital versatile disc), for example, by ripping, and the obtained content data may be stored in the HDD. Then, arbitrary content data is selected from an amount of content data stored in the HDD to be reproduced.

An example of such a method is disclosed in Japanese Unexamined Patent Application Publication No. 9-214905.

Furthermore, a considerable amount of content data may be stored not only in an HDD, but also in a plurality of apparatuses (a plurality of recording media) in a distributed manner in a home network system configured by a plurality of information processing apparatuses, such as various AV apparatuses and personal computers.

In either way, the user selects a desired piece of content data to be reproduced, for example, from among the considerable number of pieces of content data. However, when the user wishes to retrieve the desired piece of content data, all pieces of stored content data need to be scanned and checked. The larger the amount of content data is, the longer the time necessary for retrieving the desired piece of content data takes. Accordingly, an effective scanning method has been demanded.

To this end, in general, various kinds of pieces of content data are tagged and managed so that a user may easily retrieve and view a desired piece of content data.

For example, for each of the pieces of content data, a date and time of recording, a content name such as a title of a piece of music or a title of a piece of work, a name of a performer, a name of a producer, a name of a film director, and a name of an actor are set as tag information and the tag information is used to search for a desired piece of content data.

SUMMARY OF THE INVENTION

However, in general, when a desired piece of tagged content data is to be retrieved, a key word for a search should be input using a mouse or a keyboard or a pull down menu should be operated. These operations considerably rely on an operation environment of a personal computer. Therefore, a method for allowing easy selection of a desired piece of tagged content data by a simple operation such as an operation of an up button, a down button, a left button, and a right button of a remote controller for an AV apparatus, for example, has yet to be proposed.

Furthermore, when the desired piece of content data is to be retrieved using tags, the tags and pieces of content data should be easily viewable by the user. For example, even when a screen for inputting a retrieval condition is displayed, it may be difficult for the user to determine that a retrieval condition should be input. Furthermore, when the user wants to select an arbitrary piece of content data while viewing pieces of content data owned by the user, a screen for inputting a retrieval condition and a screen for displaying a list of the pieces of content data should be alternately changed. This leads to poor operability.

Accordingly, it is desirable to provide an image used in a retrieval operation to retrieve a desired piece of tagged content data in accordance with a retrieval condition and to select a desired piece of tagged content data from a list of the pieces of tagged content data by a simple operation for the user.

According to an embodiment of the present invention, there is provided a display control device which displays images used for retrieving a piece of content data among a plurality of pieces of content data on a display unit, the display control device including a retrieval image generation unit configured to generate images used in a retrieval operation which include retrieval condition images and item images arranged on a plane by arranging the retrieval condition images which indicate a plurality of retrieval conditions for the plurality of pieces of content data in a first direction on a plane, and by arranging, in a second direction, the item images which indicate pieces of content data or folders including pieces of content data categorized on the basis of the retrieval conditions represented by the retrieval condition images arranged in the first direction, and a retrieval image display control unit configured to display the images used in a retrieval operation generated using the retrieval image generation unit on the display unit, configured to detect an operation input, and configured to move an indicator, which is used for indicating a selected one of the retrieval condition images and the item images, in a vertical direction or a horizontal direction in accordance with the detected operation input.

The retrieval conditions may be categorized in accordance with pieces of information added to the pieces of content data.

Among the images used in a retrieval operation, when retrieval condition images located in a lower layer are displayed for a selected one of retrieval condition images in an upper layer, the retrieval condition images located in the upper layer are also displayed and the retrieval condition images in the lower layer are arranged in the first direction below the selected one of the retrieval condition images in the upper layer.

According to an embodiment of the present invention, there is provided a content output system, including a display apparatus, a content storage unit configured to store pieces of content data, an operation information input unit configured to input operation information, a content output unit configured to output each of the pieces of content data, and the above described display control device.

The above described units may be integrally provided in an apparatus, or may be separately provided as individual units so that the units are connected to each other to perform a system operation.

According to an embodiment of the present invention, there is provided a display control method for displaying images used for retrieving a piece of content data among a plurality of pieces of content data on a display unit, the display control method including the steps of generating images used in a retrieval operation which include retrieval condition images and item images arranged on a plane by arranging the retrieval condition images which indicate a plurality of retrieval conditions for the plurality of pieces of content data in a first direction on a plane, and by arranging, in a second direction, the item images which indicate pieces of content data or folders including pieces of content data categorized on the basis of the retrieval conditions represented by the retrieval condition images arranged in the first direction, and displaying the generated images used in a retrieval operation on the display unit, and moving an indicator, which is used for indicating a selected one of the retrieval condition images and the item images, in a vertical direction or a horizontal direction in accordance with the detected operation input.

According to an embodiment of the present invention, there is provided a program that allows an information processing apparatus to perform the above-described display control method.

Accordingly, the images used in a retrieval operation includes retrieval condition images which are arranged in a first direction (for example, in a horizontal direction) on a plane as a display screen and item images which are arranged in a second direction (for example, in a vertical direction) and which represent pieces of content data or folders categorized by the retrieval conditions represented by the retrieval condition images. Specifically, pieces of content data (or folders including the pieces of content data) are displayed on a plane by being categorized on the basis of the retrieval conditions representing pieces of tag information, for example.

Furthermore, for images used in a retrieval operation which are arranged on a plane and which include the item images and the retrieval condition images, a focus indicator is moved in accordance with a user's operation using an up key, a down key, a left key, or a right key. That is, the user may arbitrarily select a desired item image or a desired tab by moving a focus indicator on a plane. Note that an image which is currently focused upon means an item image or a retrieval condition image which is being selected. For example, an image may be focused upon by a cursor, and alternatively, an image may be focused upon by being displayed using reversing display, or the like to be displayed for the user.

Accordingly, the images used in a retrieval operation includes retrieval condition images which are arranged in a first direction on a plane as a display screen and item images which are arranged in a second direction and which represent pieces of content data or folders categorized by the retrieval conditions represented by the retrieval condition images. Since pieces of content data to be selected by the user are categorized on the basis of the retrieval conditions and are displayed on a plane, the retrieval conditions and the pieces of content data are simultaneously displayed. This makes it possible for the user to view all images to be selected and to view all retrieval conditions representing pieces of tab information. In addition, it is not necessarily to retrieve or input a retrieval condition.

Furthermore, for images used in a retrieval operation which are arranged on a plane, since a focus indicator is moved in accordance with a user's operation using an up key, a down key, a left key, or a right key, the user may arbitrarily selects a desired item image or a desired tab by moving a focus indicator on a plane. That is, since the user may select a desired retrieval condition (a piece of tag information) represented by a tab or a desired item image by moving a focus indicator on a plane, ease of a retrieval operation is further improved. Accordingly, the retrieval operation is intuitively performed by the user with ease and the operability is considerably improved.

The operation described above is implemented using a remote controller having an up key, a down key, a right key, and left key, and the remote controller is suitably used for an operation of an apparatus in which a keyboard and a mouse for a personal computer are not provided (for example, an AV apparatus).

In a screen including the images used in a retrieval operation, when tabs in a lower layer such as the second layer or the third layer are displayed as retrieval conditions, tabs in the upper layer are displayed and the tabs in the lower layer are horizontally arranged in positions corresponding to the tabs in the upper layer. In this case, when the user performs a retrieval operation from the upper layer to the lower layer, all the layers are displayed on a plane. Accordingly, the user may perform a selection operation while checking a layer in which a focus indicator is currently positioned. Specifically, the user may intuitively know the layer in which a tab (a piece of tag information) which is currently focused upon is located, and therefore, the operability in selecting a desired image is improved.

BRIEF DESCRIPTION OF THE DRAWINGS

FIGS. 4A and 4B are diagrams illustrating item images according to the embodiment;

FIG. 4C is a diagram illustrating tag information according to the embodiment;

FIG. 5 is a diagram illustrating images for retrieval operation according to the embodiment;

FIG. 11 shows diagrams illustrating a process of moving, among item images representing the images for retrieval operation according to the embodiment, a focus indicator from an item image to another item image;

FIG. 16 shows diagrams illustrating a process of adding retrieval conditions in a lower layer according to the embodiment;

FIG. 17 shows diagrams illustrating a process of adding retrieval conditions in a lower layer according to the embodiment; and FIG. 18 shows diagrams illustrating a process of adding retrieval conditions in a lower layer according to the embodiment.

DESCRIPTION OF THE PREFERRED EMBODIMENTS

Figure 1:
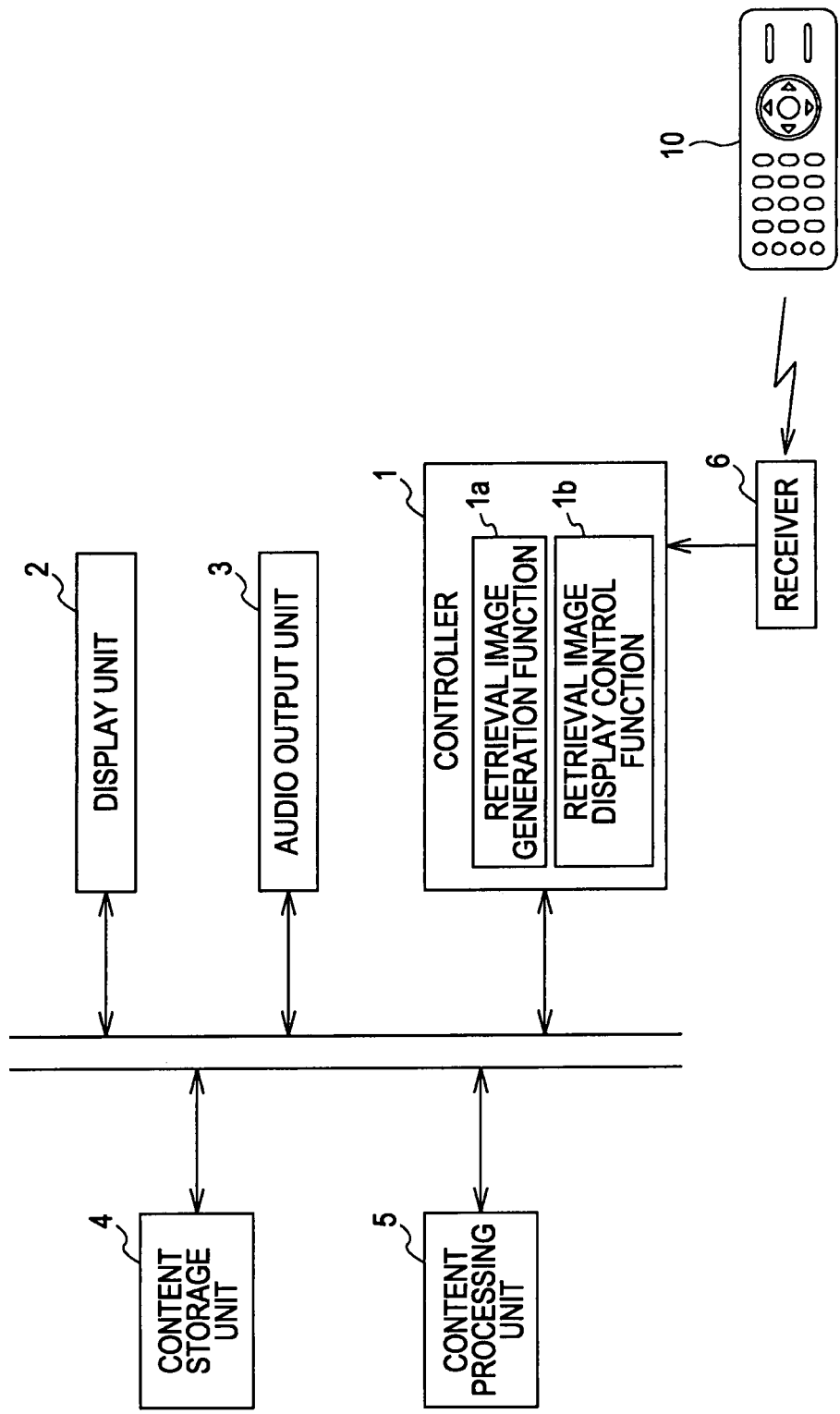
FIG. 1 is a block diagram illustrating a content output system according to an embodiment of the present invention.

Embodiments according to the present invention will be described hereinafter in a following order.
1. Configuration of Content Output System
2. Images Used in Retrieval Operation
3. Display Control of Images Used in Retrieval Operation
4. Advantages of the Embodiment and Modifications 1. Configuration of Content Output System FIG. 1 shows a configuration of a content output system according to an embodiment of the present invention. A controller 1 in the content output system corresponds to a display control device according to an embodiment of the present invention.

As shown in FIG. 1, the content output system includes a controller 1, a display unit 2, an audio output unit 3, a content storage unit 4, a content processing unit 5, and a command receiver 6.

The content storage unit 4 includes a recording medium such as an HDD (hard disc drive) or a solid-state memory and stores a considerable amount of content data, for example. Examples of content represented by the content data includes audio content such as music, video content such as video clips, movies, and broadcast programs, and still-image content such as pictures.

The content storage unit 4 may be an optical disc drive or a memory card slot which is capable of reading content data from a portable medium such as an optical disc or a memory card incorporating a flash memory.

The content processing unit 5 performs processing of content data representing content to be reproduced read from the content storage unit 4.

The display unit 2 is configured as a display device unit including a display device. The display unit 2 displays, for example, image content represented by image content data supplied from the content processing unit 5 and displays images used in a retrieval operation which are supplied from the controller 1 and which will be described later.

The audio output unit 3 includes an amplifier unit and a speaker unit. The audio output unit 3 outputs audio signals supplied from the content processing unit 5 when content is reproduced.

The controller 1 controls individual units to execute content reproduction operations. That is, the controller 1 controls the content storage unit 4 to read content data, and controls the content processing unit 5 to process the read content data. The controller 1 further controls the display unit 2 to display content in accordance with a reproduction signal (for example, a video signal) of the content data processed using the content processing unit 5, and controls the audio output unit 3 to output sound in accordance with a reproduction signal (for example, an audio signal) of the content data processed using the content processing unit 5.

The controller 1 generates the images used in a retrieval operation to be selected by the user when the user wishes to reproduce specific content, and controls the display unit 2 to display the images. Therefore, the controller 1 includes, as shown in FIG. 1, a retrieval image generation function 1a and a retrieval image display control function 1b. These functions are implemented by software programs.

The retrieval image generation function 1a has a configuration such that a plurality of retrieval-condition images which indicate conditions for retrieving content data are generated and arranged in a first direction (in a horizontal direction) on a plane and, in accordance with the retrieval-condition images arranged in the first direction (in the horizontal direction), item images representing content data which falls under the retrieval conditions or folders including the content data are generated and arranged in a second direction (in a vertical direction) on a plane. Such a configuration of the images used in a retrieval operation will be described later with reference to FIGS. 5 and 6.

Figure 7:
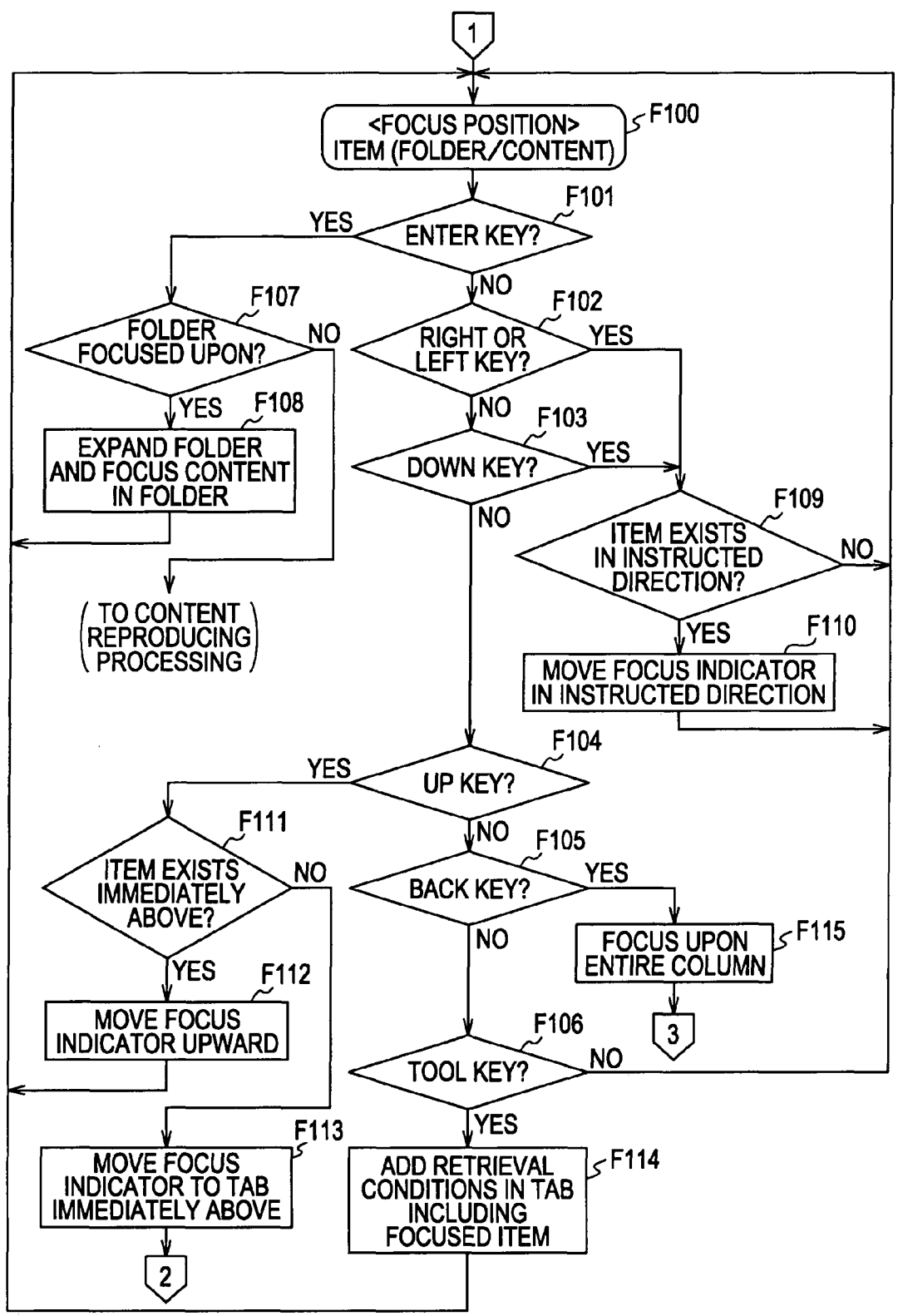
FIG. 7 is a flowchart illustrating display control processing for displaying the images for retrieval operation according to the embodiment.
Figure 8:
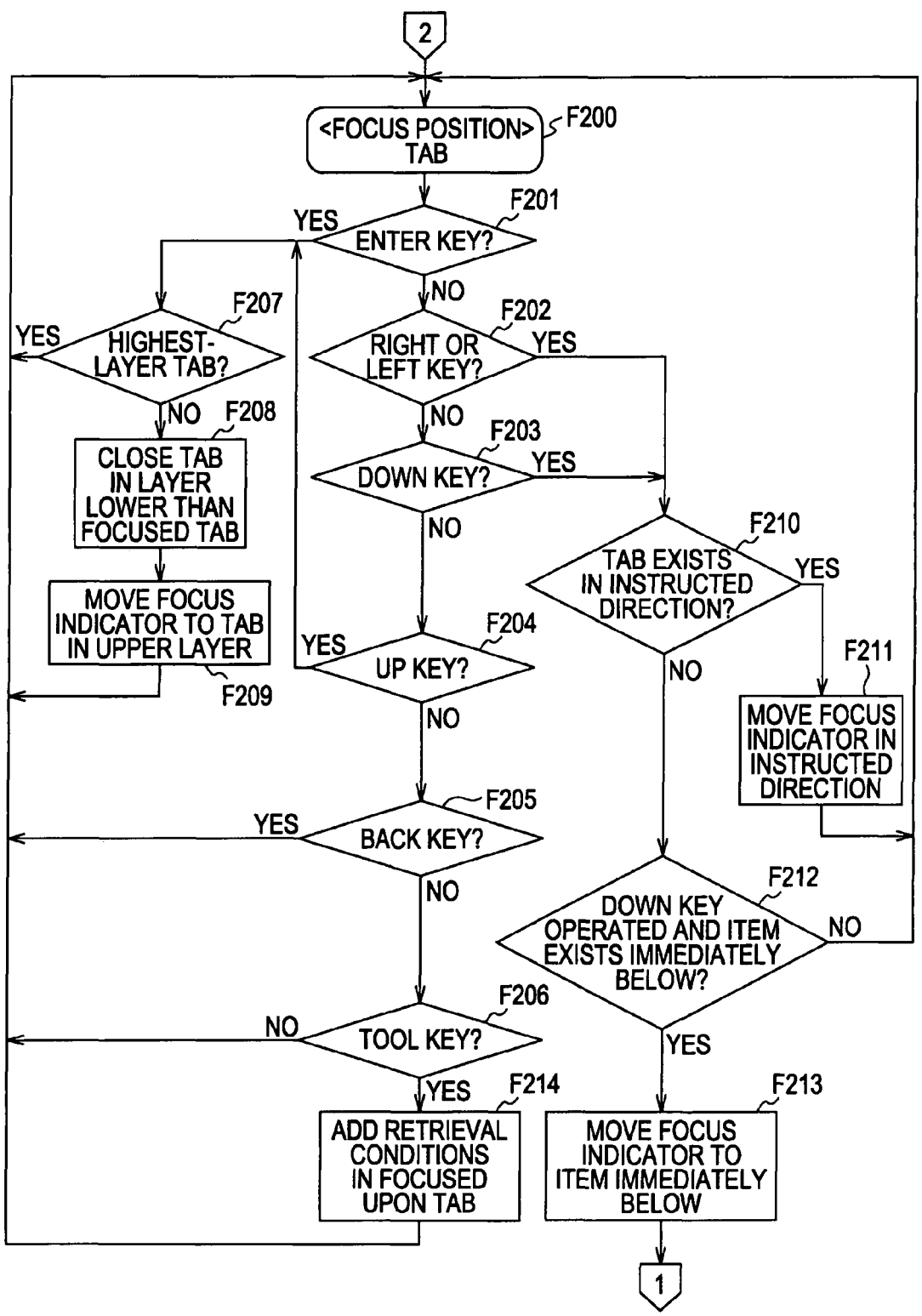
FIG. 8 is a flowchart illustrating display control processing for displaying the images for retrieval operation according to the embodiment.
Figure 9:
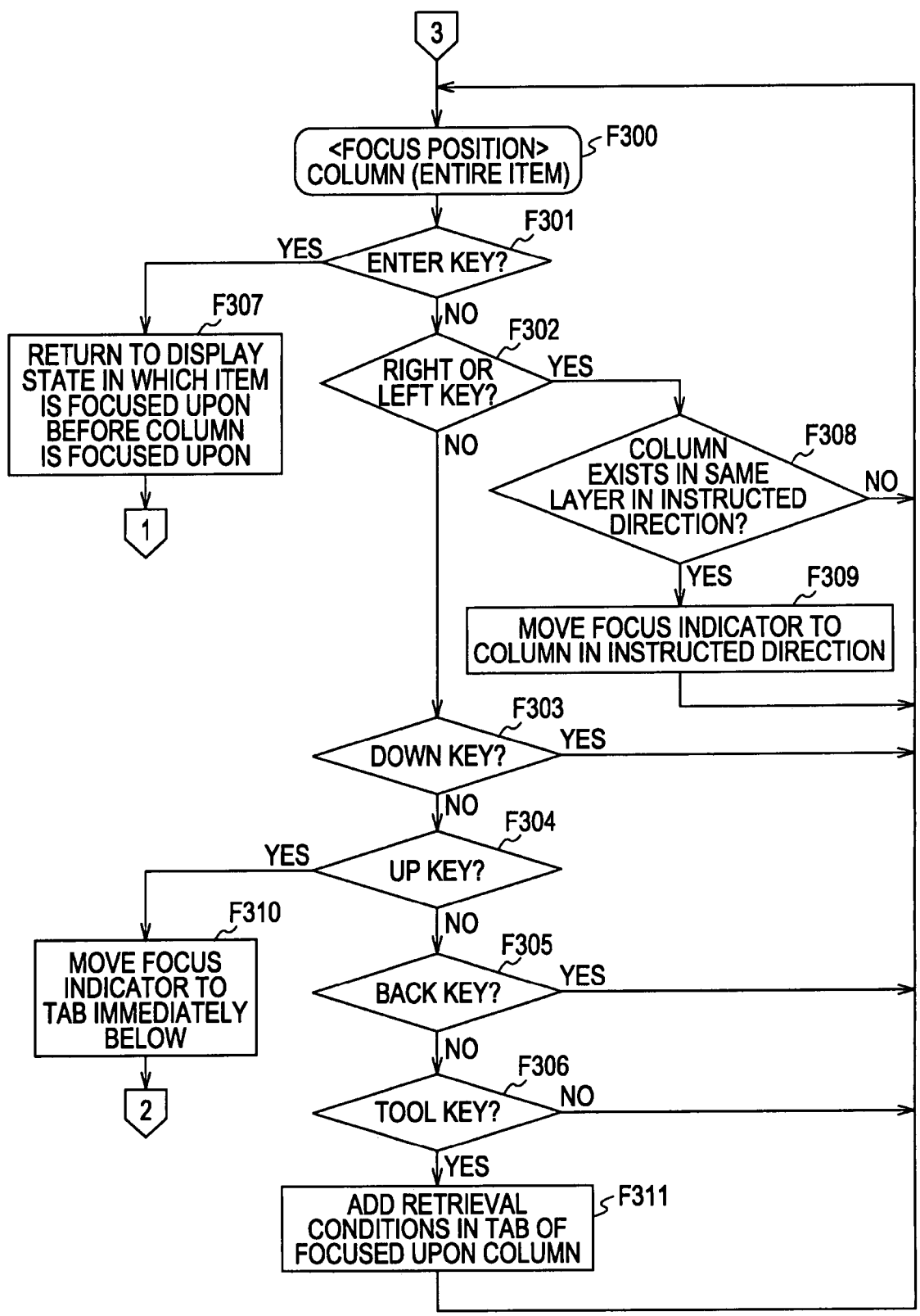
FIG. 9 is a flowchart illustrating display control processing for displaying the images for retrieval operation according to the embodiment.

The retrieval image display control function 1b controls the display unit 2 to display the images used in a retrieval operation generated using the retrieval image generation function 1a, and detects a user's operation as an input. Then the retrieval image display control function 1b performs display control in which a selection indicator (hereinafter referred to as a focus indicator), which indicates a selected one of the retrieval-condition images or a selected one of the item images, is moved in the plane in accordance with operation information input by the user. Specifically, processes shown in FIGS. 7 to 9 are performed so that the retrieval-condition images, the item images, and the focus indicator are displayed as shown in FIGS. 10 to 18.

The controller 1 detects the user's operation by receiving a command signal supplied from the command receiver 6.

The user performs various operations using a remote controller 10, for example. An infrared command signal is output from the remote controller 10 in accordance with the user's operation. The command receiver 6 receives the infrared command signal, converts the infrared command signal into an electronic signal, and transmits the electronic signal to the controller 1.

The controller 1 performs operation control such as reproduction control of the content or display control of the images used in a retrieval operation, which will be described later, in accordance with the supplied command signal, that is, in accordance with the user's operation.

Figure 2:
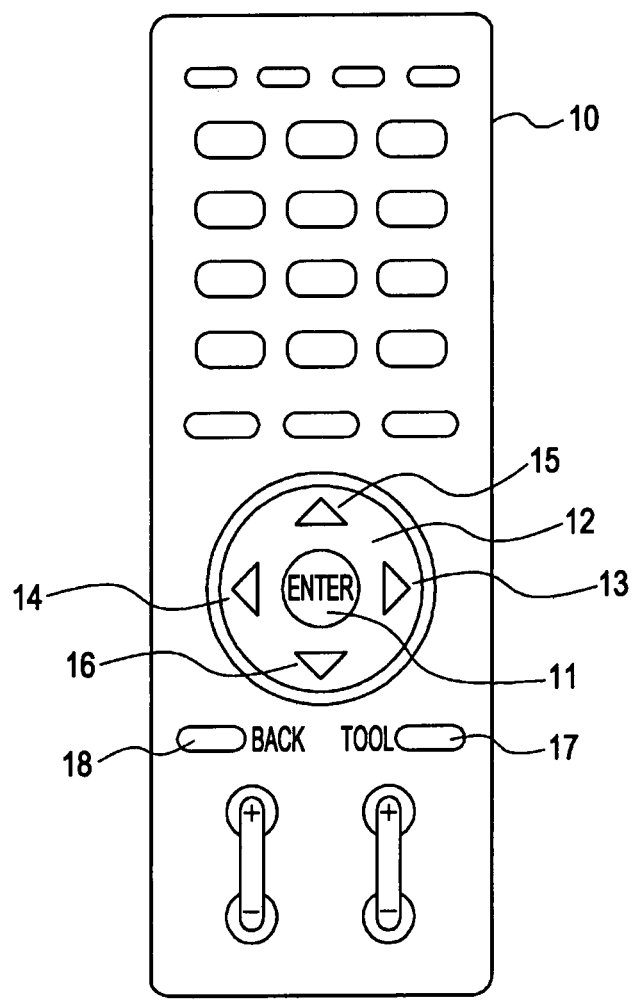
FIG. 2 illustrates a remote controller according to the embodiment.

FIG. 2 shows an example of the remote controller 10. The remote controller 10 has various operators corresponding to various operations of an AV apparatus, and outputs a command signal in accordance with one of the operator selected by the user as an infrared command signal.

The user operates an enter key 11, a cross operation unit 12, a tool key 17, and a back key 18, which are shown in FIG. 2, to select the images used in a retrieval operation, which will be described later. The cross operation unit 12 includes an up key 15, a down key 16, a right key 13, and a left key 14 to be pressed.

Although the remote controller 10 of this embodiment transmits an infrared command signal, a remote controller which transmits a command signal by a radio wave may be used, and furthermore, a wired remote controller may be used. Similarly, the operators described above may be provided on a panel of an apparatus body.

The configuration of the content output system shown in FIG. 1 is merely an example. The controller 1, the display unit 2, the audio output unit 3, the content storage unit 4, and the content processing unit 5 shown in FIG. 1 may be independently provided, may be connected to each other so as to perform data communication, and may be configured as a home network. Alternatively, the units may be integrated to configure an AV apparatus. For example, an audio composer incorporating an HDD or a video recorder incorporating an HDD may be used.

A configuration of the content storage unit 4 which stores content data is not shown in detail in FIG. 1. However, content data to be stored in the content storage unit 4 may be downloaded through an external network such as the Internet or may be supplied from an optical disc, for example, by reproducing content represented by the content data. For example, a network communication unit may be added to the configuration shown in FIG. 1 so that content data is downloaded through an external network. Alternatively, a disc drive device or a memory card slot may be provided so that music content or video content is ripped from an optical disc such as a CD (compact disc) or a DVD (digital versatile disc) or from a memory card to be stored in the content storage unit 4. Furthermore, an external device interface such as a USB (universal serial bus) may be configured so that still image content is supplied from a digital still camera, for example, to be stored in the content storage unit 4.

Furthermore, a television broadcast tuner device may be provided so that video program content supplied through television broadcast is recorded in the content storage unit 4.

Moreover, another content storage unit may be provided irrespective of whether the units shown in FIG. 1 are integrated so as to configure a single apparatus or the units shown in FIG. 1 are connected to each other so as to configure a home network.

Although content data is output as image content using the display unit 2 and is output as audio content using the audio output unit 3 in this embodiment, content data may be transmitted to another device. Here, the content data may be transmitted and received using apparatuses which are line-connected. Furthermore, the content data may be transferred to another apparatus connected through a home network, may be transmitted to another apparatus connected through an external network such as the Internet, or may be transferred to an external apparatus through a USB interface or an interface standardized by IEEE (Institute of Electrical and Electronics Engineers) 1394 as an output.

In this embodiment, images used in a retrieval operation for selecting desired content represented by content data and display control of the images used in a retrieval operation will be described hereinafter. Although various configurations for implementing this embodiment are considered, an operation of displaying the images used in a retrieval operation may be employed by an apparatus or a system including at least a unit for storing a variety of content data, a unit for outputting content represented by content data, a unit for displaying the images used in a retrieval operation for selecting the content to be output, and a unit for controlling display of the images used in a retrieval operation.

2. Images Used in Retrieval Operation

In this embodiment, the controller 1 controls the display unit 2 to display images used in a retrieval operation so that the user may easily select content data representing content to be reproduced. The user selects desired content by selecting the images used in a retrieval operation using the enter key 11, the right key 13, the left key 14, the up key 15, the down key 16, the tool key 17, and the back key 18 of the remote controller 10.

Figure 3:
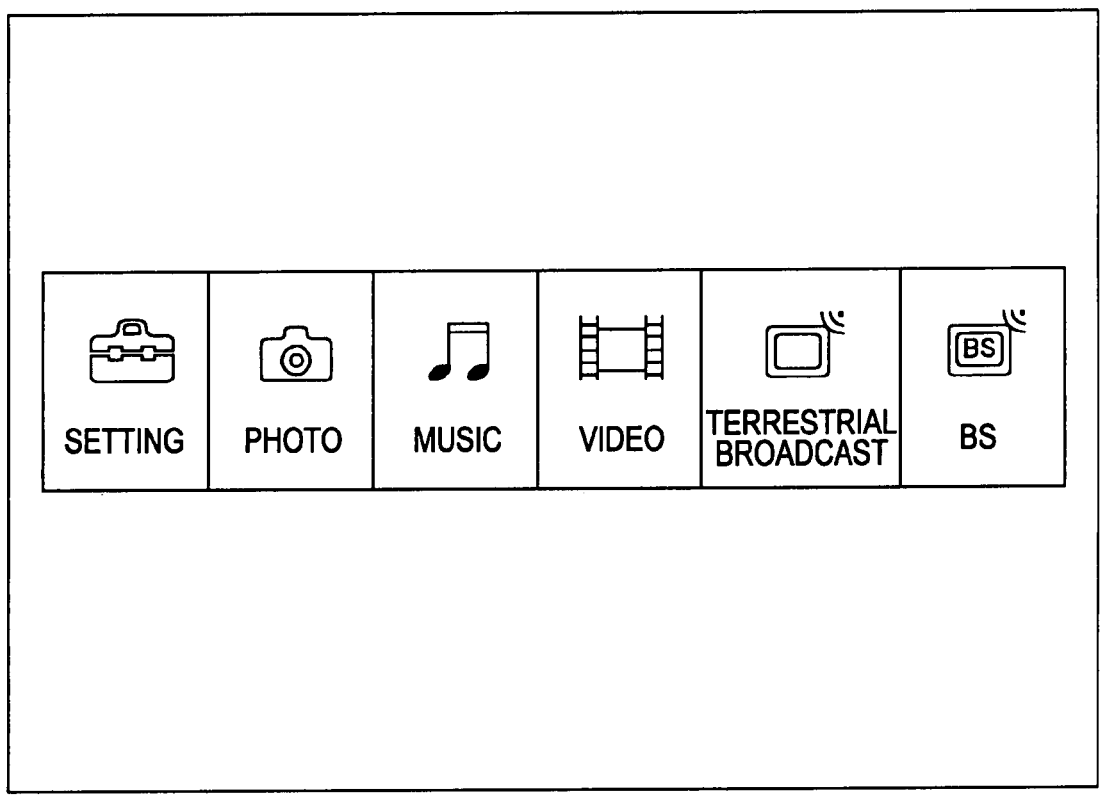
FIG. 3 is a diagram illustrating a main menu screen according to the embodiment.

Before the images used in a retrieval operation are displayed, the controller 1 controls the display unit 2 to display a menu image shown in FIG. 3, for example, as a main menu screen. In the main menu screen, selection items such as "setting", "photo", "music", "video", "terrestrial broadcast", and "BS" are shown. When the user selects "photo", the controller 1 controls the display unit 2 to display images representing pieces of photo content used in a retrieval operation. Meanwhile, when the user selects "music", the controller 1 controls the display unit 2 to display images representing pieces of music content used in a retrieval operation. Furthermore, when the user selects "video", the controller 1 controls the display unit 2 to display images representing pieces of moving image content used in a retrieval operation.

In this embodiment, an operation in which when the user selects "music", the controller 1 controls the display unit 2 to display images representing pieces of music content used in a retrieval operation will be described hereinafter. Note that images representing pieces of still image content and images representing pieces of moving image content used in a retrieval operation are displayed by operations which are similar to that used for displaying the images representing pieces of music content used in a retrieval operation.

Figure 5:
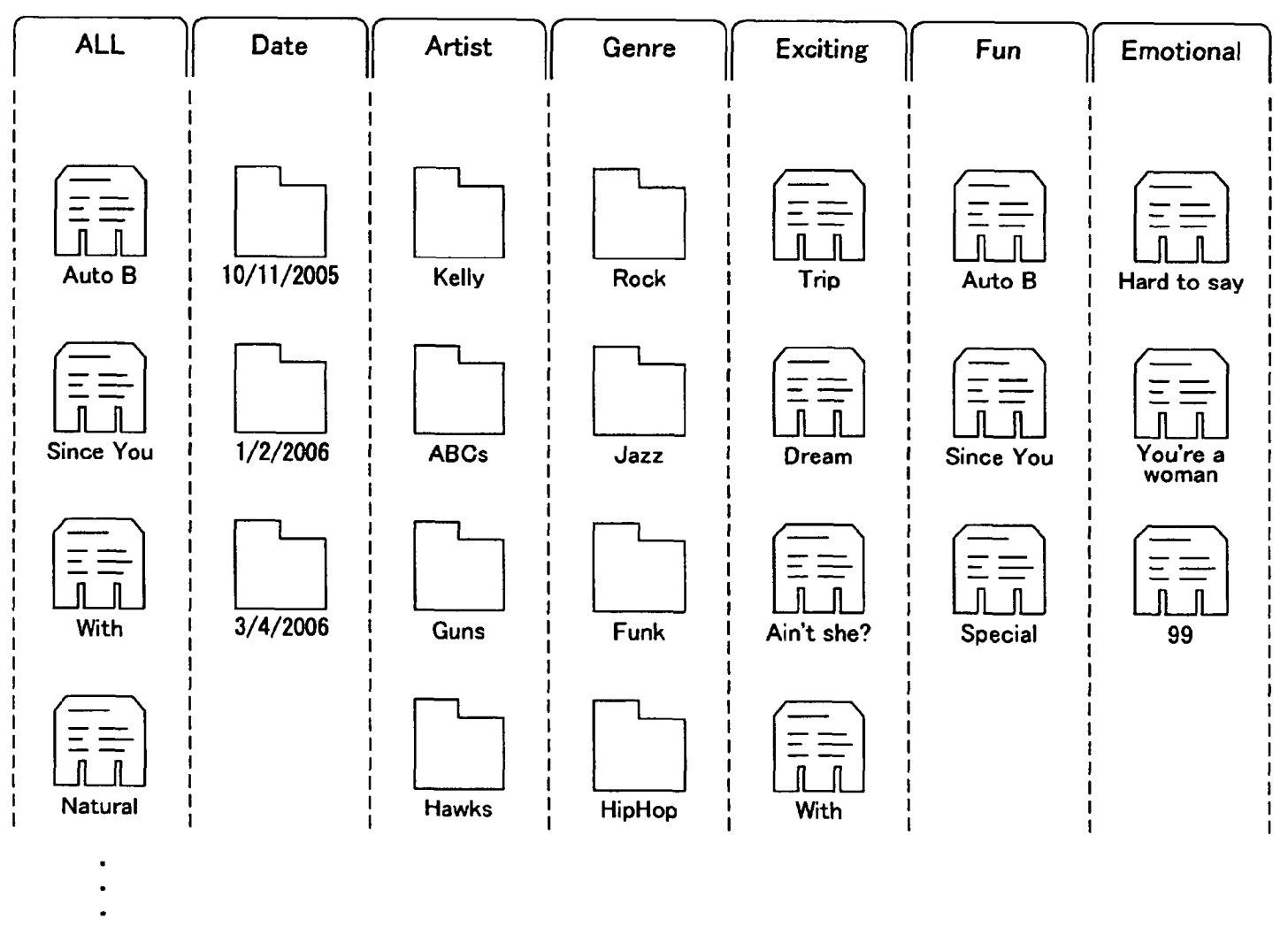

The retrieval image generation function 1a of the controller 1 generates images used in a retrieval operation having a configuration shown in FIG. 5, and one of the images used in a retrieval operation is selected by the user to select a desired piece of music content.

Among the images used in a retrieval operation, tabs serving as retrieval condition images are arranged in a horizontal direction on a plane. In FIG. 5, tabs named "ALL", "Date", "Artist", "Genre", "Exciting", "Fun", and "Emotional" are arranged as retrieval condition images.

"ALL" represents a retrieval condition under which all pieces of music content falls.

"Date" represents a retrieval condition used for retrieving a piece of content by specifying a recording date thereof.

"Artist" represents a retrieval condition used for retrieving a piece of content by specifying an artist name.

"Genre" represents a retrieval condition used for retrieving a piece of content by specifying a music genre such as rock music or jazz music.

"Exciting", "Fun", and "Emotional" represent retrieval conditions assigned by the user to arbitrary pieces of music content. For example, the user arbitrarily categorizes the pieces of music content by assigning the retrieval conditions "Exciting", "Fun", and "Emotional" in accordance with melody of music.

The above-described tabs "ALL", "Date", "Artist", "Genre", "Exciting", "Fun", and "Emotional" which are images used in a retrieval operation and which indicate retrieval conditions are called an "ALL tab", a "Date tab", an "Artist tab", a "Genre tab", an "Exciting tab", a "Fun tab", and an "Emotional tab", respectively.

Each of the pieces of music content stored in the content storage unit 4 has tag information shown in FIG. 4C, for example.

For example, an item image shown in FIG. 4A represents one of the pieces of music content which is titled "Auto B". As shown in FIG. 4C, the one of the pieces of music content which is titled "Auto B" has tag information including "Date: 1/2/2005", "Artist: ABCs", "Genre: Rock", and "USER tag: Fun". The tag information means that the piece of music content titled "Auto B" was stored in the content storage unit 4 on Jan. 2, 2005, is performed by a band named "ABCs", is categorized into rock music, and is further categorized by the user into a retrieval condition "Fun" as category information.

In accordance with such tag information assigned to each of the pieces of music contents, the controller 1 controls the display unit 2 to arrange and display the tabs (retrieval condition images), which are images used in a retrieval operation, in the horizontal direction.

Note that the tag information includes a key word manually or automatically assigned to each of the pieces of content so that a desired piece of content is easily retrieved.

For example, when a piece of content data is downloaded through an external network, the downloaded piece of content data includes such tag information in addition to music data itself. Furthermore, since the tag information is recorded in advance in an optical disc such as a DVD, when the music data is ripped, the tag information is also loaded in addition to the music data.

Furthermore, even when a piece of music content is ripped from a recording medium, such as a CD, to which tag information is not assigned, tag information may be manually input by the user or may be obtained from an information adding server (for example, a server which provides information such as a title or an artist name) through an external network.

As described above, the tabs serving as the images used in a retrieval operation are arranged in the horizontal direction. Meanwhile, item images representing the pieces of music content and folders including the pieces of music content are arranged in the vertical direction.

As described above, FIG. 4A shows an item image representing a piece of content data. FIG. 4B shows an item image representing a folder including pieces of content data. The item images having such configurations are arranged in the vertical direction as shown in FIG. 5 on the basis of the retrieval conditions represented by the tabs.

That is, item images representing all pieces of music content stored in the content storage unit 4 are vertically arranged below the ALL tab. The item images are arranged in a predetermined order such as an alphabetical order, an order of the Japanese syllabary, or an order of recording date in the content storage unit 4.

Item images representing folders including pieces of music content categorized by recording dates (dates when the pieces of music content are stored in the content storage unit 4) are vertically arranged below the Date tab in an order of date.

Item images representing folders including pieces of music content categorized by artist names are vertically arranged below the Artist tab.

Item images representing folders including pieces of music content categorized by music genres are vertically arranged below the Genre tab.

Item images representing folders including pieces of music content to which the "Exciting" tabs are arbitrarily assigned by the user are vertically arranged below the Exciting tab.

Item images representing folders including pieces of music content to which the "Fun" tabs are arbitrarily assigned by the user are vertically arranged below the Fun tab.

Item images representing folders including pieces of music content to which the "Emotional" tabs are arbitrarily assigned by the user are vertically arranged below the Emotional tab.

For example, the retrieval image generation function 1a of the controller 1 searches each of the pieces of music content stored in the content storage unit 4 for the tag information, and generates the images used in a retrieval operation shown in FIG. 5. That is, the retrieval image generation function 1a of the controller 1 horizontally arranges the images of tabs on the basis of the retrieval conditions set as the pieces of tag information. Item images representing pieces of music content (or representing folders) categorized by retrieval conditions are vertically arranged below the corresponding tabs.

Note that columns shown in FIG. 5 are merely categorized by pieces of tag information, and therefore, the same pieces of music content may be included in a plurality of columns.

Figure 6:
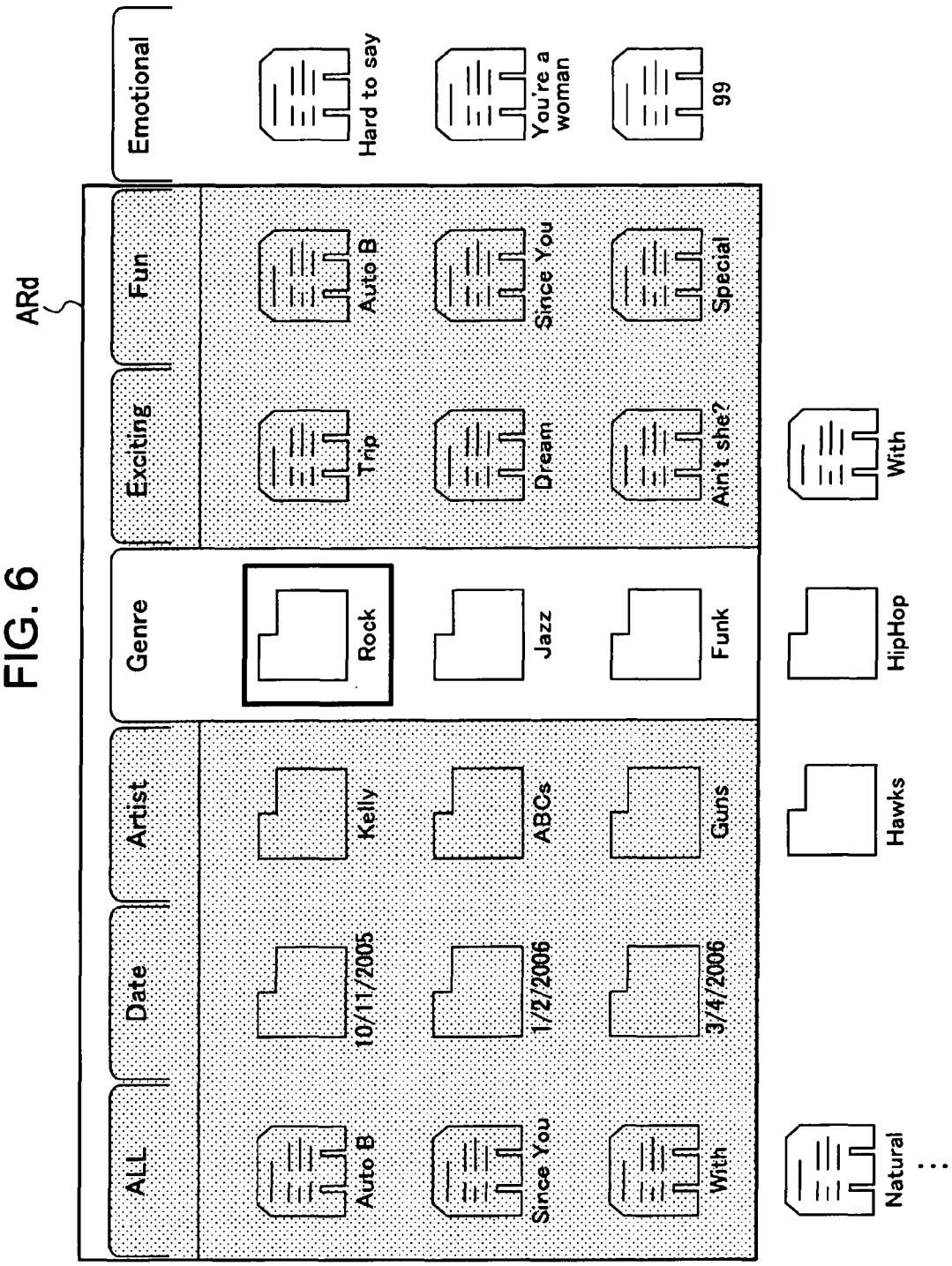
FIG. 6 is a diagram illustrating a display state of the images for retrieval operation according to the embodiment.

The images used in a retrieval operation are displayed on the display unit 2 as shown in FIG. 6.

In a case where a large number of pieces of music content are stored in the content storage unit 4, an area including all the images used in a retrieval operation arranged as shown in FIG. 5, that is, an area including all the tabs and all the item images arranged in a matrix on a plane has a considerably large size as a whole. Accordingly, it is difficult to display the entire area in the screen.

Therefore, a screen display area ARd is set in the screen as shown in FIG. 6 to display a displayable portion of the area including the images used in a retrieval operation. For example, in FIG. 6, the ALL tab to the Fun tab are displayed among the tabs horizontally arranged, and item images for three rows from the top are displayed among the item images vertically arranged. Note that an area to be displayed, which is represented by the screen display area ARd, is set in accordance with a screen size of the display unit 2 or a size of each of the item images, for example.

One of the tabs and the item images displayed in the screen display area ARd is highlighted by a focus indicator which indicates a tab or an image which is currently selected. In FIG. 6, the "Rock folder" positioned below the Genre tab is highlighted by the focus indicator as a bold frame. The focus indicator may be any type of indicator, which draws user's attention to a specific item image or a specific tab. Therefore, the focus indicator may be a bold frame as shown in FIG. 6, an underline, or a cursor, and alternatively, a specific item image or a specific tab may be displayed using reversing display, or using a color different from those of other item images and other tabs.

The user operates the remote controller 10 to move the focus indicator upward, downward, rightward, or leftward in the plane where the tabs and the item images are arranged. For example, when the focus indicator is located as shown in FIG. 6 and the user operates the down key 16, the controller 1 controls the display unit 2 to move the focus indicator to highlight the "Jazz folder" below the "Rock folder". On the other hand, when the focus indicator is located as shown in FIG. 6 and the user operates the up key 15, the controller 1 controls the display unit 2 to move the focus indicator to highlight the "Genre tab" above the "Rock folder".

As described above, since the focus indicator is moved, an area for displaying the images used in a retrieval operation may be scrolled as needed.

For example, when the user repeatedly operates the down key 16, the screen display area ARd including the item images is scrolled, whereby item images in the fourth row and below, which were not shown in the screen in FIG. 6, are displayed. On the other hand, when the user repeatedly operates the right key 13, the screen display area ARd including the tabs and the item images is scrolled, whereby tabs and item images, such as the Emotional tag, which are arranged in the right side of the screen display area ARd and were not shown in the screen, are displayed.

That is, the controller 1 controls the display unit 2 to display tags and item images which were previously located out of the screen display area ARd by scrolling the screen display area ARd in accordance with a user's operation in which the focus indicator is vertically or horizontally moved.

3. Display Control of Images Used in a Retrieval Operation

Display control processing for displaying the images used in a retrieval operation performed by the retrieval image display control function 1b of the controller 1 will be described.

FIGS. 7 to 9 are flowcharts illustrating display control processing performed by the retrieval image display control function 1b of the controller 1. FIGS. 10 to 18 are examples of display implemented by the display control processing.

As described above, when the user selects "Music" on the main menu screen shown in FIG. 3, for example, the controller 1 controls the display unit 2 to display images used in a retrieval operation representing pieces of music content as shown in FIG. 6. After the images used in a retrieval operation are displayed, the controller 1 performs processing shown in FIGS. 7 to 9.

Note that each of step F100 shown in FIG. 7, step F200 shown in FIG. 8, and step F300 shown in FIG. 9 is not a processing operation but represents a location of the focus indicator.

Step F100 shown in FIG. 7 shows a state where the focus indicator highlights an item image (which represents a piece of music content or a folder shown in FIG. 4A or 4B) among the images used in a retrieval operation, for example, as shown in FIG. 6. When the images used in a retrieval operation are displayed after the user selects "Music" in the main menu screen, a certain item image is highlighted by the focus indicator. The certain item which is highlighted first when the images used in a retrieval operation are displayed is decided as follows, for example. An item image displayed at the top (upper left) of a screen displaying the images used in a retrieval operation may be highlighted. Alternatively, an item image which was highlighted at the end of previous display of the images used in a retrieval operation may be highlighted, or an item image which was selected the last time the images used in a retrieval operation were displayed may be highlighted.

Step F200 shown in FIG. 8 shows a state where a certain tab is highlighted by the focus indicator and step F300 shown in FIG. 9 shows a state where a certain entire column is highlighted by the focus indicator.

When the images used in a retrieval operation are displayed after the user selects "Music" in the main menu screen, in step F100 shown in FIG. 7, a certain item image is highlighted by a focus indicator, for example. FIG. 7 shows processing performed in response to a user's operation when the certain item image is highlighted by the focus indicator.

Figure 10:
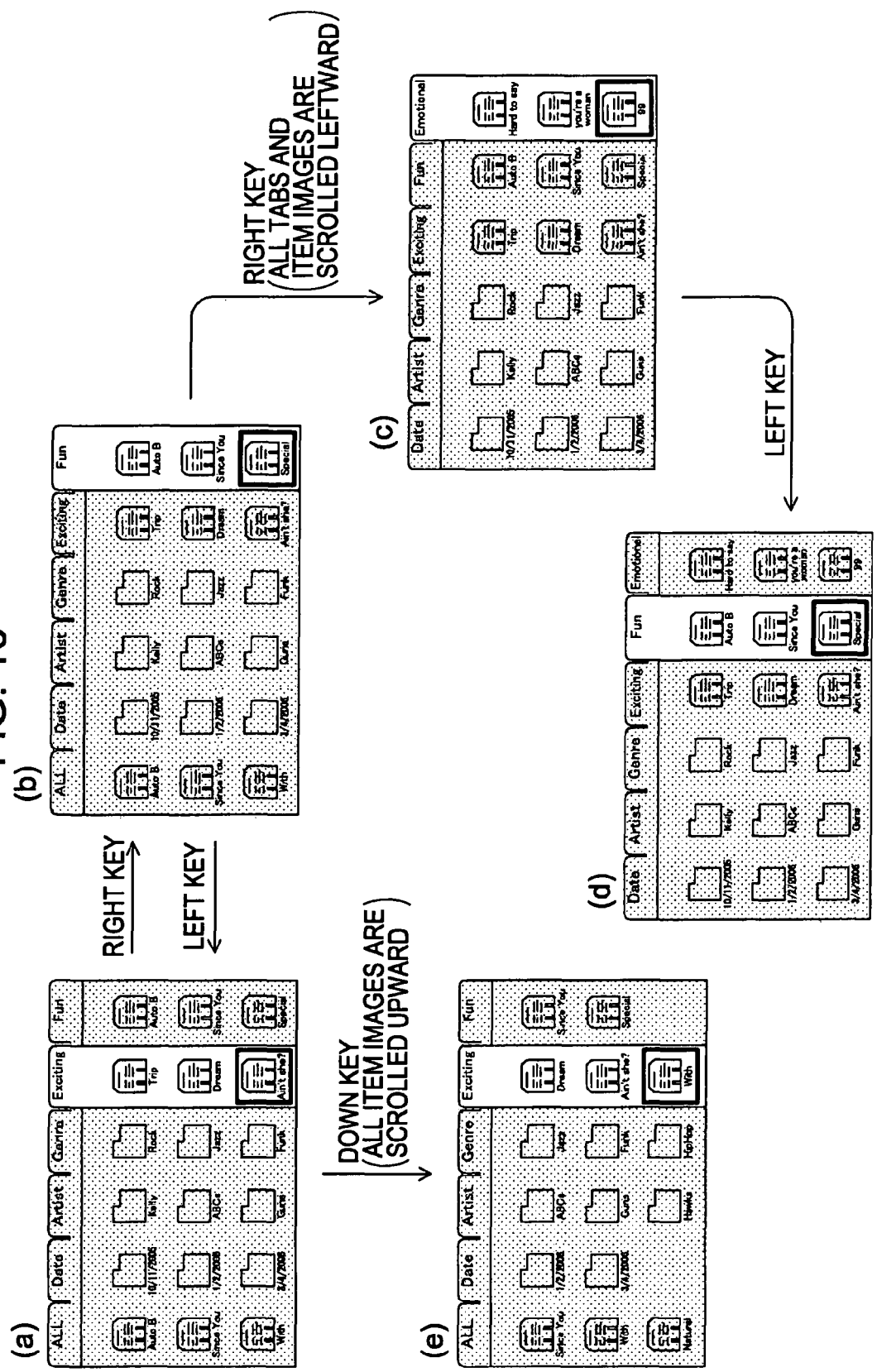
FIG. 10 shows diagrams illustrating a process of moving, among item images representing the images for retrieval operation according to the embodiment, a focus indicator from an item image to another item image.

For example, as shown in (a) of FIG. 10, a certain item image is highlighted by the focus indicator. In this state, the controller 1 monitors user's operations performed using the remote controller 10, for example, in steps F101 to F106. That is, the controller 1 checks whether the enter key 11, the right key 13 or the left key 14, the down key 16, the up key 15, the back key 18, or the tool key 17 is operated in the steps F101 to F106, respectively.

When it is determined that the user has operated the right key 13 or the left key 14, the controller 1 proceeds from step F102 to step F109.

When it is determined that the user has operated the down key 16, the controller 1 proceeds from step F103 to step F109.

In step F109, the controller 1 determines whether an item image is arranged in a direction instructed by the user's operation viewed from the currently focused upon item image (in this case, rightward, leftward, or downward). When the determination is negative, the state of display is not changed and the controller 1 returns to step F100. That is, the controller 1 monitors user's operations in steps F101 to F106.

On the other hand, when the determination in step F109 is affirmative, the controller 1 proceeds to step F110 where the focus indicator is moved to an item image arranged in the direction instructed by the user to highlight the item image.

Note that the determination as to whether an item image is arranged in a direction instructed by the user is made for not only the screen display area ARd but also an area out of the screen display area ARd which includes item images not being displayed. When an item image which has not yet been displayed is highlighted by the focus indicator, all the tabs and all the item images are scrolled. (Note that when scrolling in the vertical direction, the tabs are not scrolled but all the item images are scrolled.)

FIG. 10 shows examples of display when steps F109 and F110 are processed.

For example, in a state where a screen as shown in (a) of FIG. 10 is displayed, when the right key 13 is operated, the focus indicator is moved rightward and a screen as shown in (b) of FIG. 10 is displayed.

Furthermore, in a state where a screen as shown in (b) of FIG. 10 is displayed, when the right key 13 is further operated, the focus indicator is further moved rightward and a screen as shown in (c) of FIG. 10 is displayed. In this case, the tabs and the item images are moved leftward as a whole, which is a direction opposite that of the user's operation, whereby a column (a column of Emotional tab) including item images which is located on the immediate right of the Fun tab and which was not shown is displayed, and one of the item images of the column of Emotional tab is highlighted by the focus indicator.

In (c) of FIG. 10, in a case where the column including the highlighted item image (the column of Emotional tab) is located in the right end of all the images used in a retrieval operation, even when the right key 13 is operated in the state where a screen as shown (c) of FIG. 10 is displayed, the controller 1 determines that no more item images exist to the right of the currently focused upon image, and the focus indicator is not moved.

In the state of the screen shown in (b) of FIG. 10 where columns from ALL tab to Fun tab are displayed and a certain item image included in the column of Fun tab is highlighted by the focus indicator, when the left key 14 is operated, the focus indicator is moved to an item image located to the immediate left of the certain item image included in the column of Fun tab.

On the other hand, in the state of the screen shown in (c) of FIG. 10 where columns from Date tab to Emotional tab are displayed and a certain item image included in Emotional tab is highlighted by the focus indicator, when the left key 14 is operated, the focus indicator is moved to an item image located to the immediate left of the certain item image included in the column of Emotional tab.

Although not show, it is assumed that, in a state where a screen as shown in (d) of FIG. 10 is displayed, the left key 14 is operated four times and an item image included in Date tab is highlighted by the focus indicator. In this state, when the left key 14 is further operated, all the tabs and the item images are scrolled rightward whereby a column to the left of the column of Date tab (that is, a column of ALL tab) is displayed. Accordingly, the focus indicator highlights an item image included in the column of ALL tab.

As shown in (a) of FIG. 10, in a case where an item image in a lowest row in the screen display area ARd is focused upon, when the down key 16 is operated, all the item images are scrolled upward. That is, a display status shown in (a) of FIG. 10 where item images located from the first row to the third row are displayed is changed to a display status shown in (e) of FIG. 10 where item images located from the second row to the fourth row are displayed. In this case, an item image located in the fourth row is focused upon.

As described above, when an item image is to be focused upon (that is, an item image is to be selected) by moving the focus indicator rightward, leftward, or downward in the screen display area ARd, all the item images are not scrolled but only the focus indicator is moved in a direction instructed by the user. However, when the focus indicator is moved to an item image which is not displayed, all the item images are scrolled in response to a user's operation so that the item image to be focused upon is displayed.

In a state where a certain item image is focused upon, when it is determined that the user has operated the up key 15, the controller 1 proceeds from step F104 to step F111 shown in FIG. 7.

In this case, in step F111, the controller 1 determines whether an item image is arranged immediately above the certain item image which is currently being focused upon. When the determination is affirmative, the controller 1 proceeds to step F112 where the focus indicator is moved to the item image arranged immediately above the certain item image.

FIG. 11 shows a display example when processing in step F112 is performed.

In (a) of FIG. 11, as with (e) of FIG. 10, item images located in the second row to the fourth row are displayed. Among the displayed item images, a first item image located in the fourth row is focused upon. In this state, when the up key 15 is operated, as with (b) of FIG. 11, the focus indicator is moved from the first item image to a second item image immediately above the first image. When the up key 15 is further operated, as with (c) of FIG. 11, the focus indicator is further moved to a third item image immediately above the second item image in step F112.

When the up key 15 is further operated, the processing in step F112 is further performed. However, in this case, all the item images are scrolled downward so that the item images in the first row to the third row are displayed. In this state, the focus indicator is moved to a fourth item image immediately above the third item image which was focused in (c) of FIG. 11.

In step F111 of FIG. 7, when the determination is negative, the controller 1 proceeds to step F113. Here, in a state where an item image in the first row which is immediately below one of the tabs is focused upon as shown in (a) of FIG. 12, when the up key 15 is operated, the controller 1 determines that an item image is not arranged immediately above a currently focused upon item image. In this case, as shown in (b) of FIG. 12, the controller 1 controls the focus indicator to be moved to a tab arranged immediately above the item image which had been focused. That is, the screen shows a tab which is selected.

In a state where a certain item image is focused upon, when it is determined that the user has operated the enter key 11, the controller 1 proceeds from step F101 to step F107.

In this case, in step F107, it is determined whether the certain item image which is currently focused upon represents a folder or a piece of content.

When it is determined that the certain item image represents a piece of content, the controller 1 determines that the user selected a piece of content using the images used in a retrieval operation and proceeds to content reproduction processing. For example, the controller 1 controls the display unit 2 to terminate the display of the images used in a retrieval operation, activates an application of content reproduction processing, and executes reproduction of the selected content.

On the other hand, in a case where it is determined that the selected item image represents a folder in step F107, when the enter key 11 is operated, the controller 1 proceeds to step F108. In this case, the selected folder and other folders which are included in the same column of a tab including the selected folder are expanded. Then, the focus indicator is moved to an item image representing a piece of content in the selected folder.

Figure 13:
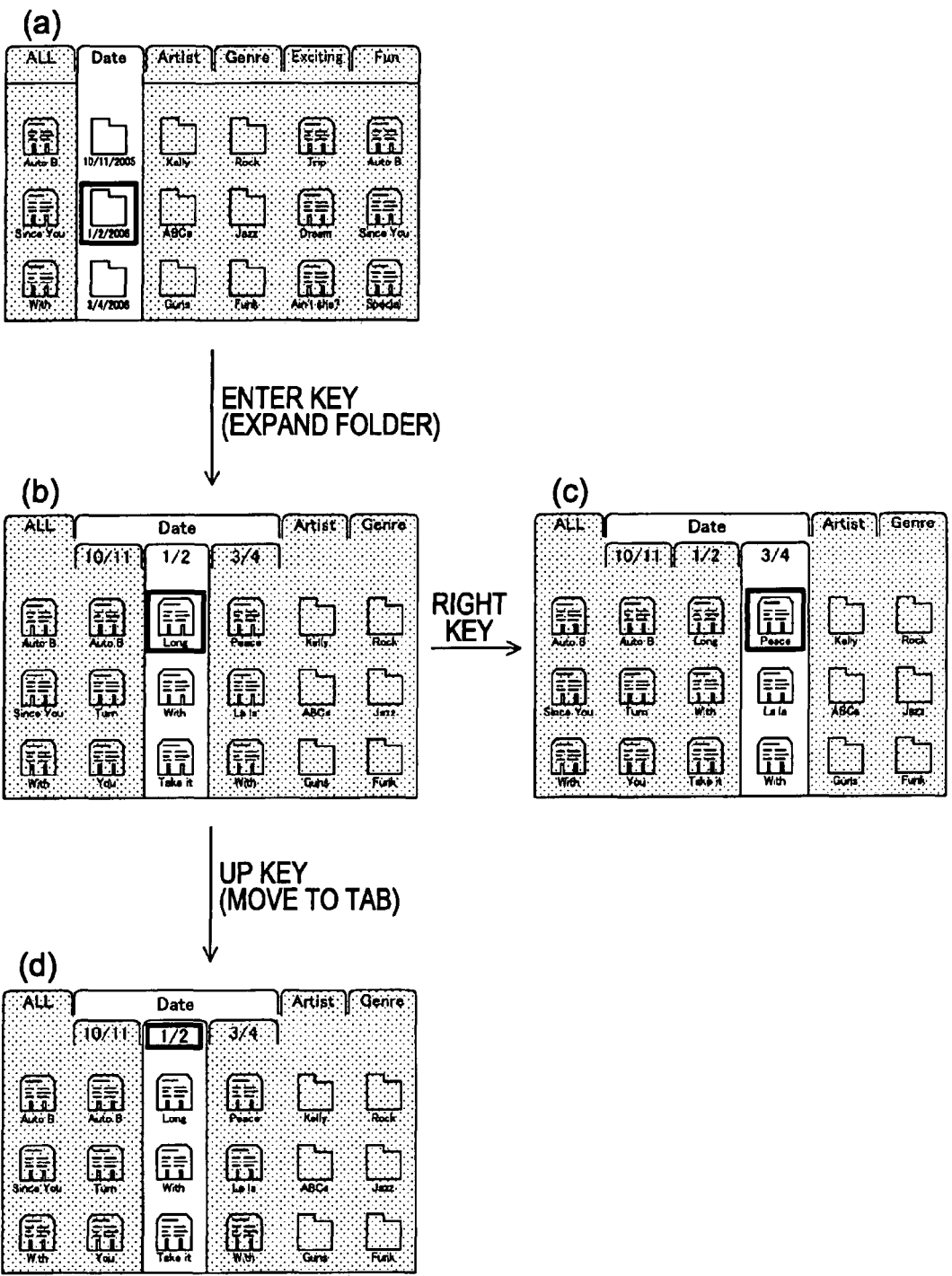
FIG. 13 shows diagrams illustrating a process of moving, among images for retrieval operation according to the embodiment, a focus indicator from an image to another image and a process of expanding a folder.

FIG. 13 shows a display example of the above processing. A folder titled "1/2/2006" included in a column of Date tab is focused upon in (a) of FIG. 13. In this state, when it is determined that the user has operated the enter key 11, all folders included in the column of date tab are expanded as shown in (b) of FIG. 13. Specifically, the expanded folders are shown as tabs which are arranged in a layer (a second layer) under Date tab and which serve as retrieval conditions. In this case, dates which were assigned to the corresponding folders are arranged under the Date tab as second-layer tabs in a horizontal direction. The second-layer tabs have corresponding columns including pieces of content represented by item images arranged in the vertical direction. In this case, since the folder which is titled "1/2/2006" was selected, an item image which represents a piece of content and which is located, for example, on the first row of the column under "1/2/2006" is focused upon.

One of the folders is expanded as described above to display retrieval conditions in the second layer. In this case, since the tabs in the second layer are arranged on a plane while the tabs in the first layer such as ALL tab and Date tab are displayed, the user may easily confirm a layer of interest, and therefore, the operability in retrieving operation is improved.

After the one of the folders is expanded whereby the tabs in the second layer are displayed and the focus indicator is moved to one of the item images in the second layer, the focus indicator is similarly moved in accordance with a user's operation using the right key 13, the left key 14, the up key 15, or the down key 16.

For example, in a state where a screen as shown in (b) of FIG. 13 is displayed, when the right key 13 is operated, the controller 1 proceeds from step F102 to step F109 and further to step F110. Then, as shown in (c) of FIG. 13, the focus indicator is moved to an item image located to the immediate right of an item image which was focused in (b) of FIG. 13.

For example, in a state where a screen as shown in (b) of FIG. 13 is displayed, when the up key 15 is operated, the controller 1 proceeds from step F104 to step F111. However, since an item image is not arranged above the item image which is focused in (b) of FIG. 13, the controller 1 proceeds to step F113 where the focus indicator is moved, as shown in (d) of FIG. 13, to a tab arranged immediately above the item image which was focused in (b) of FIG. 13.

When processing in step F113 shown in FIG. 7 is performed in response to the operation of the up key 15, the controller 1 proceeds to step F200 shown in FIG. 8. That is, a certain tab is focused as shown (b) of FIG. 12 or (d) of FIG. 13. In this case, the controller 1 monitors user's operations performed in steps F201 to F206 shown in FIG. 8. That is, the controller 1 monitors user's operations performed using the enter key 11, the right key 13 or the left key 14, the down key 16, the up key 15, the back key 18, and the tool key 17 in steps F201 to F206 shown in FIG. 8.

In a state where the tab is focused, when it is determined that the user has operated the right key 13 or the left key 14, the controller 1 proceeds from step F202 to step F210.

In a state where the tab is focused, when it is determined that the user has operated the down key 16, the controller 1 proceeds from step F203 to step F210.

In step F210, the controller 1 determines whether a tab is arranged in a direction (in this case, immediately right, immediately left, or immediately below the currently focused upon tab) instructed by the user's operation viewed from the currently focused upon tab.

When the determination is affirmative, the controller 1 proceeds to step F211 where the focus indicator is moved to a tab located in the direction instructed by the user's operation.

Figure 12:
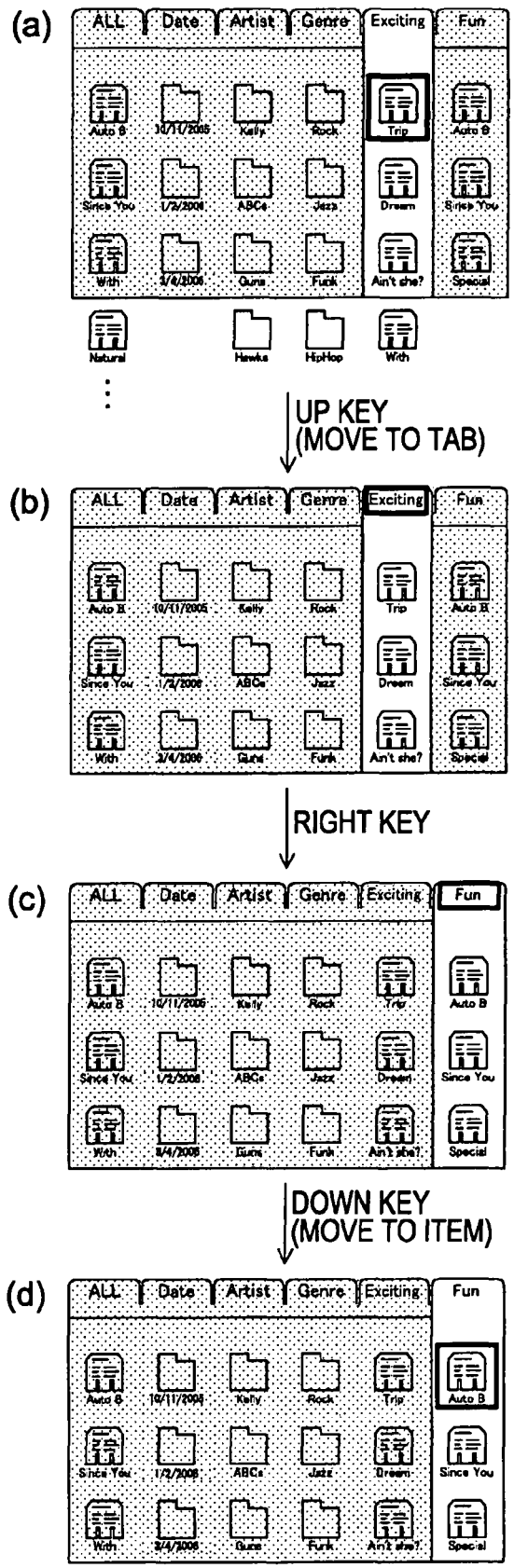
FIG. 12 shows diagrams illustrating a process of moving, among tabs and item images representing the images for retrieval operation according to the embodiment, a focus indicator from an item image to a tab and a tab to an item image.

For example, in a state where Exciting tab is focused upon as shown in (b) of FIG. 12, when the right key 13 is operated, the focus indicator is moved to Fun tab arranged immediately right of Exciting tab as shown in (c) of FIG. 12.

The focus tab is similarly moved in the second layer. For example, in a state where "½" tab in the second layer is focused upon as shown in (a) of FIG. 14, when the right key 13 is operated, the focus indicator is moved to "¾" tab arranged immediately right of "½" tab as shown in (b) of FIG. 14.

Note that, as with the case in step F109, the determination as to whether a tab is arranged in a direction instructed by the user is made for not only the screen display area ARd but also an area out of the screen display area ARd which includes tabs not being displayed. When a tab which has not yet been displayed is to be highlighted by the focus indicator, all the tabs and all the item images are scrolled.

Although not shown, for example, in the state shown in (c) of FIG. 12, when the right key 13 is further operated, all the tabs and all the item images are scrolled. In this case, Emotional tab arranged immediately right of Fun tab is shown in the screen and the focus indicator is moved to Emotional tab.

On the other hand, when a tab is not arranged in the direction instructed by the user's operation, the controller 1 proceeds to step F212. In step F212, it is determined whether the user has operated the down key 16 and whether an item image representing a piece of content or a folder is arranged immediately below the tab which is currently focused upon.

When it is determined that the user has operated the right key 13 or the left key 14, or when it is determined that the user has operated the down key 16 but an item image is not arranged immediately below the tab which is currently focused upon, a display state is not changed and the controller 1 returns to step F200. That is, the controller 1 monitors user's operations in steps F201 to F206.

In step S212, it is determined that the user has operated the down key 16 and an item image is arranged immediately below the currently focused upon tab, the controller 1 proceeds to step F213 where the focus indicator is moved to the item image which is arranged immediately below the tab.

For example, in the state shown in (c) of FIG. 12, when it is determined that the user has operated the down key 16, as shown in (d) of FIG. 12, the focus indicator is moved to an item image arranged immediately below the tab which is focused upon in (c) of FIG. 12.

Note that when the processing in step F213 is performed whereby an item image is highlighted by the focus indicator, the controller 1 returns to step F100 of FIG. 7 where the controller 1 monitors user's operations in steps F101 to F106.

In a state where a tab is focused upon, it is determined that the user has operated the up key 15 or the enter key 11, the controller 1 proceeds from step F204 or step F201 to step F207.

In step F207, it is determined whether the tab which is currently focused upon is included in the first layer (that is, whether the tab is any one of ALL tab, Date tab, Artist tab, Genre tab Exciting tab, Fun tab, Emotional tab). When the determination is affirmative, a display state is not changed.

On the other hand, when the determination is negative, the controller 1 determines that the user has operated the up key 15 or the enter key 11 to close the tab which is currently focused upon (that is, to store item images in corresponding folders). That is, in step F208, the controller 1 closes all tabs included in layers lower than the layer including the tab which is currently focused upon, and in step F209, the focus indicator is moved to a tab in a layer higher than the layer including the tab which is focused upon.

Figure 14:
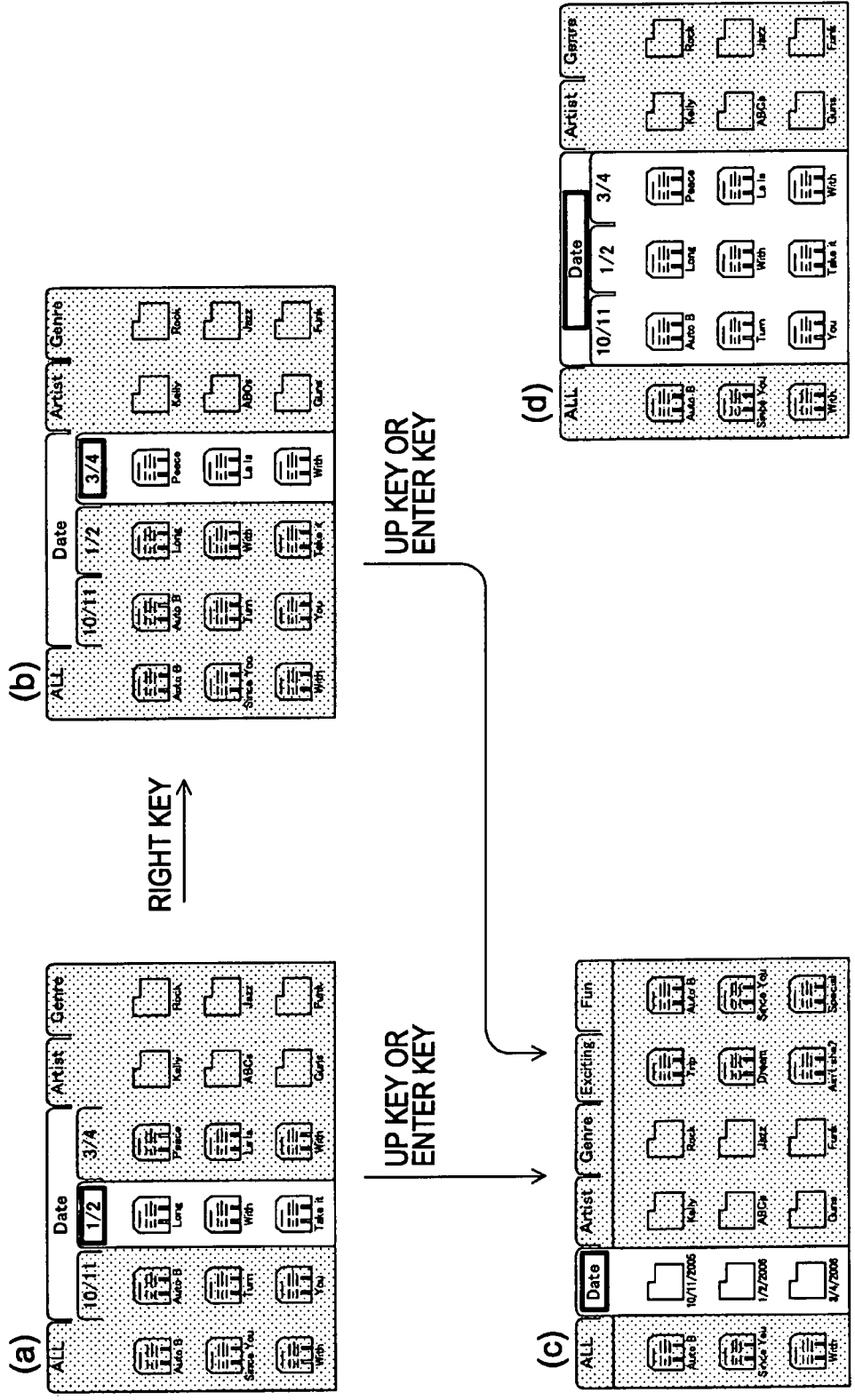
FIG. 14 shows diagrams illustrating a process of moving, among images for retrieval operation according to the embodiment, a focus indicator from an image to another image and a process of closing a folder.

For example, as shown in (a) or (b) of FIG. 14, in a state where a tab included in the second layer is focused upon, when the up key 15 or the enter key 11 is operated, tabs indicating dates are closed to be stored in folders, and the focus indicator is moved to Date tab which is located in an immediately upper layer.

Note that in this embodiment, in a state where a tab in the second or lower layer is focused upon, when the up key 15 or the enter key 11 is operated, the tab is closed. However, for example, in this state, when the up key 15 is operated, the focus indicator may be simply moved upward. For example, in the state where a tab in the second layer is focused upon as shown in (a) or (b) of FIG. 14, when the up key 15 is operated, the focus indicator may be moved to Date tab in the first layer while the tabs in the second layer are displayed as shown in (d) of FIG. 14.

As is apparent from the description hereinabove, when images used in a retrieval operation are displayed, the user operates the right key 13, the left key 14, the up key 15, and the down key 16, whereby the user may arbitrarily select (focus upon) an item image or a tab represented by one of the images used in a retrieval operation which are arranged on a plane.

Furthermore, the operation of the enter key 11 allows the user to select a piece of content, to expand a folder (displays tabs in a lower layer), or to close the tabs in the lower layer (stores item images in folders).

That is, the user may select a desired item image or a desired tab, and further utilize retrieval conditions in lower layers with simple operation.

In addition, in this embodiment, use of the back key 18 or the tool key 17 improves ease of retrieval operation.

In a state where an item image is focused upon, when it is determined that the user has operated the back key 18, the controller 1 proceeds from step F105 to step F115 where an entire column including the item image which is currently focused upon is highlighted. For example, in a state where an item image included in "½" tab is focused upon as shown in (a) of FIG. 15, when the back key 18 is operated, an entire column of "½", tab is highlighted, that is, all item images in "½" tab are highlighted as shown in (b) of FIG. 15.

In this case, the controller 1 proceeds to step F300 in FIG. 9 where the controller 1 monitors user's operations in steps F301 to F306. That is, the controller 1 monitors user's operations using the enter key 11, the right key 13 or the left key 14, the down key 16, the up key 15, the back key 18, and the tool key 17 in steps F301, F302, F303, F304, F305, and F306, respectively.

As with the case where the controller 1 returns from step F205 to step F200 in FIG. 8, the controller 1 determines that an operation of the back key 18 is invalid when a tab is focused upon.

Figure 15:
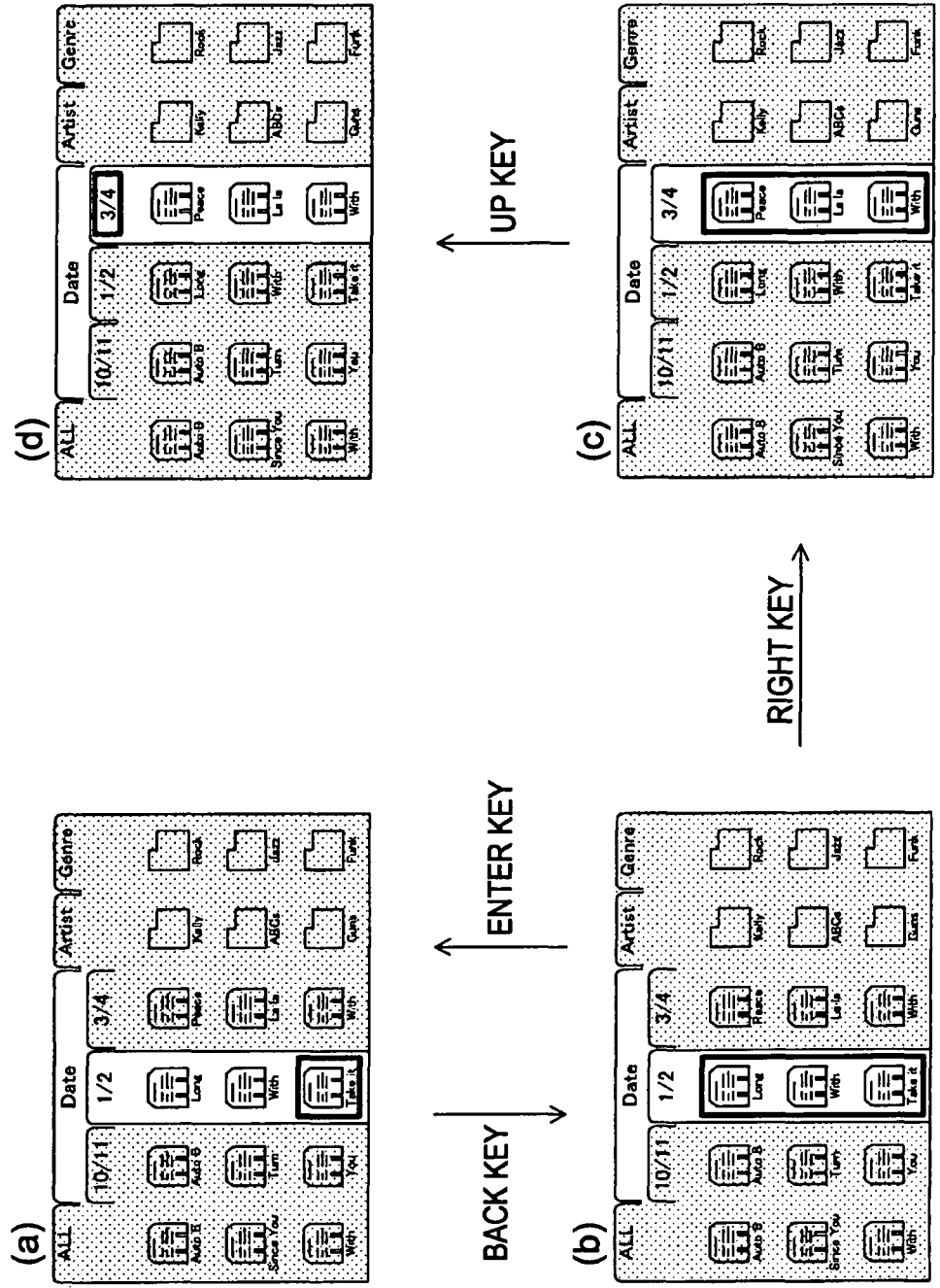
FIG. 15 shows diagrams illustrating a process of moving a focus indicator from an image to an entire column and a process of moving a focus indicator from an entire column to an image according to the embodiment.

In a state where an entire column is focused upon, when the enter key 11 is operated, highlight of the entire column is cancelled. That is, when it is determined that the enter key 11 is operated in step F301, the controller 1 proceeds to step F307 where a display state is returned to a state where the item image is focused upon before the entire column is focused upon. For example, in a state where a screen as shown in (a) of FIG. 15 is displayed, when the back key 18 is operated, a screen as shown in (b) of FIG. 15 is displayed. In this state, when the enter key 11 is operated, the screen as shown in (a) of FIG. 15 is displayed again.

In the state where an entire column is focused upon, when it is determined that the right key 13 or the left key 14 is operated, the controller 1 proceeds from step F302 to step F308. In step F308, the controller 1 determines whether a column is arranged in the layer including the column which is currently focused upon in a direction instructed by a user's operation. When the determination is affirmative, the controller 1 proceeds to step F309 where the focus indicator is moved to an entire column arranged in the direction instructed by the user's operation.

For example, in the state where the screen as shown in (b) of FIG. 15 is displayed, when the right key 13 is operated, as shown in (c) of FIG. 15, the focus indicator is moved to an entire column on the immediately right of the column which was focused upon in (b) of FIG. 15.

Note that in (c) of FIG. 15, the rightmost column below a tab in the second layer is highlighted. Therefore, in the state where the screen as shown in (c) of FIG. 15 is displayed, when the right key 13 is further operated, the controller 1 determines, in step F308, that a column is not arranged on the immediately right of the column which is highlighted in (c) of FIG. 15, and therefore, the focus indicator is not moved.

In the case where an entire column is focused upon, when it is determined that the up key 15 is operated, the controller 1 proceeds from step F304 to step F310 where the focus indicator is moved to a tab located above the selected column. For example, in the state where the screen as shown in (c) of FIG. 15 is displayed, when the up key 15 is operated, the focus indicator is moved to a tab located above the highlighted column as shown in (d) of FIG. 15.

Such an operation of the focus indicator in accordance with an operation of the back key 18 is useful when a number of item images are arranged in the vertical direction. For example, in a case where a number of item images are vertically arranged below a certain tab, the user may select desired items successively by repeatedly operating the down key 16. However, when the focus indicator proceeds to an item image far below the certain tab, the user has to operate the up key 15 the number of times the user has operated the down key 16 to reach the item image far below the certain tab. In this case, as described above, the back key 18 is operated so that a column including the item image which is focused upon is highlighted, and furthermore, the up key 15 is operated so that the focus indicator is moved to the certain tab. By this, the operability for the user is considerably improved.

For example, it is assumed that 50 item images are vertically arranged, and the focus indicator is moved to a 50th item image far below a certain tab. In this case, if the user wishes to move the focus indicator back to the certain tab from the 50th item image, the user has to operate the up key 15 50 times. However, as described above, the focus indicator is moved back to the certain tab when the user merely performs two operations. That is, the user operates the back key 18 so that a column below the certain tab is highlighted, and furthermore, the user operates the up key 15 so that the focus indicator is moved back to the certain tab.

As described above, in the state where an entire column is highlighted, the focus indicator is moved to a tab, and here, the controller 1 returns to step F200 in FIG. 8. Then, the controller 1 proceeds to step F201 onward in accordance with a user's operation.

In the state where a column is highlighted, when it is determined that the down key 16 is operated, the controller 1 proceeds from step F303 to step F300 in FIG. 9. In this case, the controller 1 does not control the display unit 2 to change the display state.

Furthermore, in the state where a column is highlighted, when it is determined that the back key 18 is operated, the controller 1 proceeds from step F305 to step F300 in FIG. 9. In this case, the controller 1 does not control the display unit 2 to change the display state.

That is, in the state where a column is highlighted, even when the down key 16 or the back key 18 is operated, the controller 1 determines that the operation is invalid.

Processing performed in response to an operation of the tool key 17 will now be described.

In a case where a certain item image is focused upon, when it is determined that the user has operated the tool key 17, the controller 1 proceeds from step F106 to step F114 of FIG. 7 where retrieval conditions are added below a tab including the item image which is focused upon as retrieval conditions in a lower layer.

For example, as shown in (a) of FIG. 16, in a state where an item image included in "½" tab which represents a date and which is located below Date tab is focused upon, when it is determined that the tool key 17 is operated, the controller 1 adds lower-layer tabs (that is, tabs located below "½", tab) serving as retrieval conditions for "½" tab. In this case, as shown in (b) of FIG. 16, "Artist" tab, "Genre" tab, "Exciting" tab, and "Fun" tab are added and displayed as tabs in the third layer below "½" tab serving as a tab in the second layer. Then, item images (representing pieces of content or folders) are vertically arranged and displayed below the corresponding tabs in the third layer.

Specifically, in a case where "½", tab includes item images representing pieces of content to which pieces of tag information "Artist", "Genre", "Exciting", and "Fun" are added, the item images representing pieces of content recorded on 2nd of January are further categorized and displayed on the basis of the pieces of tag information, as described above.

Note that the focus indicator may be located in an item image arranged as the first item image (located in the upper left) among the categorized item imaged in the third layer, as shown in (b) of FIG. 16. Alternatively, the focus indicator may be located in an item image which was focused upon before the tool key 17 is operated and which is arranged in a position determined by being categorized on the basis of the retrieval conditions in the third layer.

On the other hand, in a state where a certain tab is focused upon, when it is determined that the user has operated the tool key 17, the controller 1 proceeds from step F206 to step F214 of FIG. 8 where retrieval conditions are added below a tab which is focused upon as retrieval conditions in a lower layer.

For example, as shown in (a) of FIG. 17, in a state where "½" tab which represents a date and which is located below Date tab is focused upon, when it is determined that the tool key 17 is operated, the controller 1 adds lower-layer tabs (that is, tabs located below "½" tab) serving as retrieval conditions for "½" tab. In this case, as shown in (b) of FIG. 17, "Artist" tab, "Genre" tab, "Exciting" tab, and "Fun" tab are added and displayed as tabs in the third layer below "½" tab serving as a tab in the second layer. Then, item images (representing pieces of content or folders) are vertically arranged and displayed below the corresponding tabs in the third layer.

Figure 17:
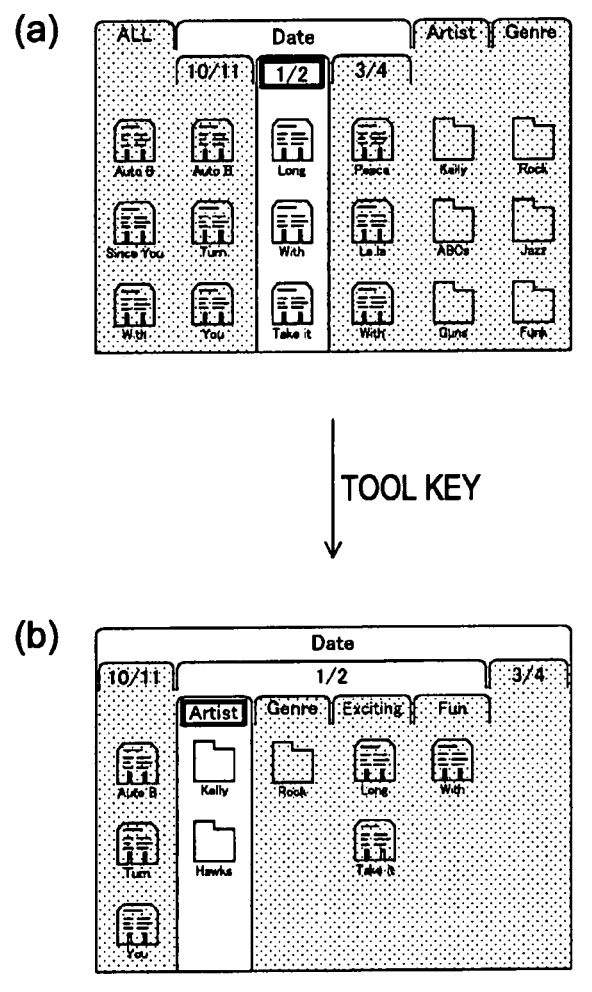

Note that the focus indicator may be located in a tab arranged as a first tab (located in the upper left) in the third layer, as shown in (b) of FIG. 17, or may be located in any other tab. Alternatively, the focus indicator may be moved to an item image as shown in (b) of FIG. 16.

Furthermore, in a state where an entire column is focused upon, when it is determined that the user has operated the tool key 17, the controller 1 proceeds from step F306 to step F311 of FIG. 8 where retrieval conditions are added below a tab which is arranged immediately above the column which is focused upon as retrieval conditions in a lower layer.

For example, as shown in (a) of FIG. 18, in a state where "½" tab which represents a date and which is located below Date tab is focused upon, when it is determined that the tool key 17 is operated, the controller 1 adds lower-layer tabs (that is, tabs located below "½", tab) serving as retrieval conditions for "½" tab. In this case also, as shown in (b) of FIG. 18, "Artist" tab, "Genre" tab, "Exciting" tab, and "Fun" tab are added and displayed as tabs in the third layer below "½" tab serving as a tab in the second layer. Then, item images (representing pieces of content or folders) are vertically arranged and displayed below the corresponding tabs in the third layer.

Note that the focus indicator may be located in a column arranged as a first column (a leftmost column) in the third layer, as shown in (b) of FIG. 17, or may be located in any other column. Alternatively, the focus indicator may be moved to a tab or an item image.

As described above, retrieval conditions representing pieces of tag information are displayed as tabs in a lower layer in accordance with a user's operation using the tool key 17, and item images are categorized in accordance with the retrieval conditions. This configuration enables a retrieval operation using pieces of tag information in combination. In addition, since tabs in each of the layers are arranged on a plane, it is possible for the user to know a layer in which a retrieval operation is currently performed, and therefore, ease of retrieval operation is improved.

Note that when the third layer is displayed, processing operations illustrated in FIGS. 7, 8, and 9 are similarly performed. That is, when the third layer is displayed, the focus indicator may be similarly moved in accordance with the right key 13, the left key 14, the up key 15, or the down key 16, each of the folders may be similarly expanded in response to the operation of the enter key 11, each of the folders may be similarly closed in response to the operation of the enter key 11, and the focus indicator may be similarly moved to highlight an entire column in response to the operation of the back key 18.

Furthermore, in a state where an item image or a tab in the third layer is focused upon, when it is determined that the tool key 17 is operated, tabs in the fourth layer may be similarly displayed. For example, in a state where a screen as shown in (b) of FIG. 16 is displayed, when it is determined that the tool key 17 is operated, "Genre" tab, "Exciting" tab, and "Fun" tab may be arranged and displayed below "Artist" tab in the horizontal direction as tabs in the fourth layer, and item images or folders may be arranged and displayed below "Genre" tab, "Exciting" tab, and "Fun" tab.

4. Advantages of the Embodiment and Modifications

A display control performed in accordance with a user's operation when images used in a retrieval operation are displayed is described hereinabove. However, for example, since images used in a retrieval operation are displayed as described above and the focus indicator is moved as described above, ease of retrieval operation for the user is considerably improved.

Specifically, the images used in a retrieval operation includes tabs which are horizontally arranged on a plane as a display screen and which serve as retrieval conditions and item images which are vertically arranged and which represent pieces of content data or folders categorized by the retrieval conditions represented by the tabs. Since pieces of reproducible content data stored in the content storage unit 4, that is, pieces of content data to be selected by the user are categorized on the basis of the retrieval conditions and are displayed on a plane, the retrieval conditions and the pieces of content data are simultaneously displayed. This makes it possible for the user to view all images to be selected and to view all retrieval conditions representing pieces of tab information. In addition, it is not necessarily to retrieve or input a retrieval condition.

Note that, tabs may be vertically arranged and item images may be horizontally arranged on the screen.

Furthermore, for images used in a retrieval operation which are arranged on a plane, since a focus indicator is moved in accordance with a user's operation using an up key, a down key, a left key, or a right key, the user may arbitrarily selects a desired item image or a desired tab by moving a focus indicator on a plane. That is, since the user may select a desired retrieval condition (a piece of tag information) represented by a tab or a desired item image by moving a focus indicator on a plane, ease of a retrieval operation is further improved. Accordingly, the retrieval operation is intuitively performed by the user with ease and the operability is considerably improved.

The operation described above is implemented using a remote controller having an up key, a down key, a right key, and left key as shown in FIG. 2, and is suitably used for an operation of a personal computer in which a keyboard and a mouse are not provided.

The display processing operation described using FIGS. 7, 8, and 9 is merely an example, and various methods of a display control using a focus indicator moved in accordance with various operations using operation keys may be proposed. Any other method of display control may be employed as long as images used in a retrieval operation including tabs and item images are arranged on a plane, the user may easily move a focus indicator in a vertical direction and a horizontal direction, and the user may easily perform an operation of expanding a folder.

In a screen including the images used in a retrieval operation, when tabs in a lower layer such as the second layer or the third layer are displayed as retrieval conditions, tabs in the upper layer are also displayed and the tabs in the lower layer are horizontally arranged in positions corresponding to the tabs in the upper layer. In this case, when the user performs a retrieval operation from the upper layer to the lower layer, all the layers are displayed on a plane. Accordingly, the user may perform a selection operation while checking a layer in which a focus indicator is currently positioned. Specifically, the user may intuitively know the layer in which a tab (a piece of tag information) which is currently focused upon is located, and therefore, the operability in selecting a desired image is improved.

Furthermore, as with the case where the third layer is displayed in accordance with the user's operation using the tool key 17, in a state where a certain tab representing a piece of tag information is displayed, tabs which are added in a lower layer of the certain tab and which are the tabs the same as those in a layer including the certain tab, but except for the certain tab, are displayed and item images are categorized in accordance with the tabs in the lower layer and are displayed. Accordingly, a desired piece of content represented by a piece of content data or a desired retrieval condition is easily retrieved using pieces of tag information assigned to pieces of content data in combination.

Note that, in this embodiment, a retrieval operation of a piece of music content using images used in a retrieval operation is described as an example. However, as described above, the embodiment of the present invention may be applicable to a retrieval operation of a piece of moving image content or a piece of still image content (a piece of picture data).

This embodiment may be applicable to a retrieval operation of other objects. For example, the embodiment may be applicable to a retrieval operation of a piece of program content such as an application program (for example, a retrieval operation for retrieving a program to be installed or a retrieval operation for retrieving a program to be activated). Furthermore, this embodiment may be applicable to a retrieval operation of a desired piece of text content such as a novel, an essay, or text of news.

A program according to an embodiment of the present invention is used to generate the above-described images used in a retrieval operation, and allows an information processing apparatus to perform a display control of the images used in a retrieval operation. The program implements display of the images used in a retrieval operation which has the advantage described above. Furthermore, when a program recording medium in which such a program is recorded is used, the embodiment of the present invention may be broadly employed.

The program of this embodiment may be stored in an HDD serving as a storage medium incorporated in an AV apparatus, for example, or a ROM in a microcomputer in advance.

Furthermore, the program of this embodiment may be temporarily or permanently stored (recorded) in a removable recording medium such as a flexible disc, a CD-ROM (compact disc read only memory), an MO (magneto-optical) disc, a DVD (digital versatile disc), a Blu-ray disc, a magnetic disc, a semiconductor memory, or a memory card. Such a removable recording medium may be provided as so-called package software.

Moreover, the program of this embodiment may be installed in a personal computer, for example, from a removable recording medium or may be downloaded from a software download site through a network such as a LAN (local area network) or the Internet.

It should be understood by those skilled in the art that various modifications, combinations, sub-combinations and alterations may occur depending on design requirements and other factors insofar as they are within the scope of the appended claims or the equivalents thereof.

What is claimed is:

1. A display control device which displays images used for retrieving a piece of content data from among a plurality of pieces of content data displayed on a display unit, the display control device comprising:

a retrieval image generation unit configured to generate images which are used in a retrieval operation and which include retrieval condition images and item images each arranged on a plane by arranging the retrieval condition images, which indicate a plurality of retrieval conditions for the plurality of pieces of content data, in a first direction on the plane, and by arranging, in a second direction on the plane, the item images which indicate pieces of content data or folders including pieces of content data categorized based on the retrieval conditions represented by the retrieval condition images arranged in the first direction; and a retrieval image display control unit configured to display on the display unit the images used in the retrieval operation generated using the retrieval image generation unit, to detect an operation input, and to move an indicator, which is used for indicating a selected one of the retrieval condition images and the item images, in a vertical direction or in a horizontal direction in accordance with the detected operation input, wherein the selected one of the item images is a folder representing a first layer of information, and in response to the retrieval image display control unit detecting operation input that requests expansion of the folder, further item images associated with the folder are also displayed in the plane and are arranged, together with the selected one of the retrieval condition images and the selected one of the item images, along a same line in the second direction, the further item images representing a second layer of information, and the item images are folders representing associated first layers of information, and in response to the retrieval image display control unit detecting operation input that requests expansion of the folder associated with the selected one of the item images, the retrieval condition image that represents the retrieval condition that categorizes the selected one of the item images is expanded along the first direction, each of the item images that are categorized based on the retrieval conditions represented by that retrieval condition image are arranged along the first direction at a same distance in the second direction from the expanded retrieval condition image, and further item images associated with the folders of the item images arranged along the first direction are also displayed in the plane and are arranged along a same line in the second direction as the item image associated with that further item image, the further item images representing the second layer of information.

2. The display control device according to claim 1, wherein the retrieval conditions are categorized in accordance with pieces of information added to the pieces of content data.

3. The display control device according to claim 1, wherein at least a portion of the retrieval condition images not selected are displayed and remain arranged on the plane in the first direction, and the item images categorized based on the retrieval conditions represented by these retrieval condition images are displayed and remain arranged on the plane in the second direction.

4. A content output system, comprising:
a display apparatus;
a content storage unit configured to store pieces of content data;
an operation information input unit configured to input operation information;
a content output unit configured to output each of the pieces of content data; and a display control device configured to display images used in a retrieval operation in which one of the pieces of content data, which is stored in the content storage unit and which is to be output from the content output unit, is selected, the display control device including:
  a retrieval image generation unit configured to generate images which are used in a retrieval operation and which include retrieval condition images and item images each arranged on a plane by arranging the retrieval condition images, which indicate a plurality of retrieval conditions for the plurality of pieces of content data, in a first direction on the plane, and by arranging, in a second direction on the plane, the item images which indicate pieces of content data or folders including pieces of content data categorized based on the retrieval conditions represented by the retrieval condition images arranged in the first direction, and
  a retrieval image display control unit configured to display on the display unit the images used in a retrieval operation generated using the retrieval image generation unit, to detect an operation input, and to move an indicator, which is used for indicating selected one of the retrieval condition images and the item images, in a vertical direction or in a horizontal direction in accordance with the detected operation input,
  wherein the selected one of the item images is a folder representing a first layer of information, and in response to the retrieval image display control unit detecting operation input that requests expansion of the folder, further item images associated with the folder are also displayed in the plane and are arranged, together with the selected one of the retrieval condition images and the selected one of the item images, along a same line in the second direction, the further item images representing a second layer of information, and
  the item images are folders representing associated first layers of information, and in response to the retrieval image display control unit detecting operation input that requests expansion of the folder associated with the selected one of the item images, the retrieval condition image that represents the retrieval condition that categorizes the selected one of the item images is expanded along the first direction, each of the item images that are categorized based on the retrieval conditions represented by that retrieval condition image are arranged along the first direction at a same distance in the second direction from the expanded retrieval condition image, and further item images associated with the folders of the item images arranged along the first direction are also displayed in the plane and are arranged along a same line in the second direction as the item image associated with that further item image, the further item images representing the second layer of information.

5. A display control method for displaying images used for retrieving a piece of content data from among a plurality of pieces of content data displayed on a display unit, the display control method comprising the steps of:
  generating images which are used in a retrieval operation and which include retrieval condition images and item images each arranged on a plane by arranging the retrieval condition images, which indicate a plurality of retrieval conditions for the plurality of pieces of content data, in a first direction on the plane, and by arranging, in a second direction on the plane, the item images which indicate pieces of content data or folders including pieces of content data categorized based on the retrieval conditions represented by the retrieval condition images arranged in the first direction; and
  displaying on the display unit the images used in the retrieval operation generated using the retrieval image generation unit, to detect an operation input, and to move an indicator, which is used for indicating a selected one of the retrieval condition images and the item images, in a vertical direction or in a horizontal direction in accordance with the detected operation input,
  wherein the selected one of the item images is a folder representing a first layer of information, and in response to detecting operation input that requests expansion of the folder, further item images associated with the folder are also displayed in the plane and are arranged, together with the selected one of the retrieval condition images and the selected one of the item images, along a same line in the second direction, the further item images representing a second layer of information, and
  the item images are folders representing associated first layers of information, and in response to detecting operation input that requests expansion of the folder associated with the selected one of the item images, the retrieval condition image that represents the retrieval condition that categorizes the selected one of the item images is expanded along the first direction, each of the item images that are categorized based on the retrieval conditions represented by that retrieval condition image are arranged along the first direction at a same distance in the second direction from the expanded retrieval condition image, and further item images associated with the folders of the item images arranged along the first direction are also displayed in the plane and are arranged along a same line in the second direction as the item image associated with that further item image, the further item images representing the second layer of information.

6. A processor encoded with a program which is executed to carry out a method of displaying images used for retrieving a piece of content data from among a plurality of pieces of content data displayed on a display unit, the method comprising:
  generating images which are used in a retrieval operation and which include retrieval condition images and item images each arranged on a plane by arranging the retrieval condition images, which indicate a plurality of retrieval conditions for the plurality of pieces of content data, in a first direction on the plane, and by arranging, in a second direction on the plane, the item images which indicate pieces of content data or folders including pieces of content data categorized based on the retrieval conditions represented by the retrieval condition images arranged in the first direction; and
  displaying on the display unit the images used in the retrieval operation generated using the retrieval image generation unit, to detect an operation input, and to move an indicator, which is used for indicating a selected one of the retrieval condition images and the item images, in a vertical direction or in a horizontal direction in accordance with the detected operation input,
  wherein the selected one of the item images is a folder representing a first layer of information, and in response to detecting operation input that requests expansion of the folder, further item images associated with the folder are also displayed in the plane and are arranged, together with the selected one of the retrieval condition images and the selected one of the item images, along a same line in the second direction, the further item images representing a second layer of information, and the item images are folders representing associated first layers of information, and in response to detecting operation input that requests expansion of the folder associated with the selected one of the item images, the retrieval condition image that represents the retrieval condition that categorizes the selected one of the item images is expanded along the first direction, each of the item images that are categorized based on the retrieval conditions represented by that retrieval condition image are arranged along the first direction at a same distance in the second direction from the expanded retrieval condition image, and further item images associated with the folders of the item images arranged along the first direction are also displayed in the plane and are arranged along a same line in the second direction as the item image associated with that further item image, the further item images representing the second layer of information.

* * * * *